United States Patent
Furukawa et al.

(10) Patent No.: US 11,827,822 B2
(45) Date of Patent: Nov. 28, 2023

(54) ADHESIVE TAPE AND ELECTRONIC DEVICE

(71) Applicant: DIC Corporation, Tokyo (JP)

(72) Inventors: Yoshimi Furukawa, Saitama (JP); Yuuya Kitade, Saitama (JP); Yuusuke Takahashi, Tokyo (JP); Takeshi Iwasaki, Saitama (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 17/808,791

(22) Filed: Jun. 24, 2022

(65) Prior Publication Data

US 2023/0022110 A1    Jan. 26, 2023

(30) Foreign Application Priority Data

Jul. 8, 2021    (JP) .................... 2021-113395

(51) Int. Cl.
| | | |
|---|---|---|
| *C09J 7/26* | (2018.01) | |
| *C09J 11/06* | (2006.01) | |
| *C09J 7/50* | (2018.01) | |
| *C09J 183/04* | (2006.01) | |

(52) U.S. Cl.
CPC . *C09J 7/26* (2018.01); *C09J 7/50* (2018.01); *C09J 11/06* (2013.01); *C09J 183/04* (2013.01); *C09J 2203/326* (2013.01)

(58) Field of Classification Search
CPC .......... C09J 7/26; C09J 7/385; C09J 2433/00; C09J 2301/312
See application file for complete search history.

(56) References Cited

U.S. PATENT DOCUMENTS

| | | | | |
|---|---|---|---|---|
| 10,093,835 B2* | 10/2018 | Yamakami | ................ | C09J 7/29 |
| 10,793,755 B2* | 10/2020 | Iwasaki | ..................... | C09J 7/26 |
| 2004/0260024 A1* | 12/2004 | Gehlsen | .................... | C09J 7/22 |
| | | | | 525/227 |
| 2011/0129661 A1* | 6/2011 | Tsubaki | ................... | C09J 11/04 |
| | | | | 428/323 |
| 2014/0356615 A1* | 12/2014 | Komatsuzaki | ............ | C09J 7/26 |
| | | | | 428/315.5 |
| 2023/0026124 A1* | 1/2023 | Furukawa | ................ | C09J 7/385 |

FOREIGN PATENT DOCUMENTS

JP    2010-260880 A    11/2010

* cited by examiner

*Primary Examiner* — Patricia L. Nordmeyer
(74) *Attorney, Agent, or Firm* — Osha Bergman Watanabe & Burton LLP; Jeffrey S. Bergman

(57) ABSTRACT

Provided is an adhesive tape that has satisfactory conformability to a high step of an adherend while maintaining high impact resistance, and has removable performance that enables easy peeling when articles, such as electronic devices, are disassembled. The adhesive tape has an adhesive layer on one side or both sides of a foam base directly or with another layer interposed therebetween. The foam base has a tensile strength of 650 N/cm² or more in a flow direction, a compressive strength at 25% of 1000 kPa or less, and a density of 0.35 g/cm³ to 0.90 g/cm³.

12 Claims, 3 Drawing Sheets

ADHESIVE TAPE AND ELECTRONIC DEVICE

TECHNICAL FIELD

One or more embodiments of the present invention relate to an adhesive tape usable for fixing parts of electronic devices such as portable electronic terminals, and to an electronic device.

BACKGROUND

Adhesive tapes are widely used, for example, in situations such as fixing parts of electronic devices. Specifically, the adhesive tapes are used to fix protective panels of image displays, constituting small electronic devices such as portable electronic terminals, cameras, and personal computers, to housings and to fix rigid parts such as exterior parts and batteries to the small electronic devices.

Adhesive tapes, for example, having an adhesive layer on both sides of a flexible foam base have been known as such adhesive tapes that are thin and highly conformable to adherends (for example, see Japanese Unexamined Patent Application Publication No. 2010-260880). In recent years, panels with curved surfaces and complex shapes are increasingly used in terms of design, and adhesive tapes with higher conformability to uneven surfaces and high steps are desired. With more and more electronic devices such as televisions and smartphones being waterproofed, adhesive tapes used to fix components have been required to have high conformability to steps of housings or circuit boards and high adhesive strength in order to prevent water intrusion.

As electronic devices such as portable electronic terminals are used in a wide variety of situations, adhesive tapes for use in electronic devices are required to have impact resistance to such a degree that the parts do not chip or peel off upon impact, for example, when the portable electronic terminals are dropped. In terms of such impact resistance, tapes having adhesive layers on both sides of the foam base have been used.

In order to improve manufacturing yields of portable electronic devices and the like, double-sided adhesive tapes or parts that have failed to be bonded are sometimes stripped off from workpieces (rework), or housings or parts are sometimes detached, disintegrated, or disassembled so that finished products are repaired or recycled or reused. In such cases, adhesive tapes easy to disassemble are desired.

In recent years, organic EL information display devices have been increasingly used in order to achieve higher resolution in information display. However, such organic EL display devices are expensive and requested to be recycled when electronic devices are repaired. The adhesive tapes used for organic EL display devices therefore have been required not only to firmly bond the parts of the organic EL display devices but also to be readily peeled off without leaving adhesive residue on the parts of the organic EL display devices.

In particular, in information display devices containing a large number of parts, the angular direction in which the adhesive tape can be peeled is limited, so the adhesive tape must be able to be stretched and peeled at relatively small angles, such as 0° to 90°, to the adherend surface. In this way, adhesive tapes used for fixing electronic devices and information display devices are required to have conformability and impact resistance and also to have removable performance that enables the tapes to be easily peeled off without destroying the components of information displays and electronic devices during disassembly and enables release of adhesive fixing between the parts through the tape.

However, in a double-sided adhesive tape with a foam base, if the foam base tears off due to interlaminar fracture and the like during stretching, the tape tends to remain on the surface of the part and is difficult to remove. This reduces the efficiency of the operation of removing the double-sided adhesive tape from the housing or part and reattaching a fresh double-sided adhesive tape, the yield of housings, parts, and products, and the recycling rate.

In order to stretch and peel off the adhesive tape, it is generally effective to increase the strength so that the adhesive tape does not tear off in the process. However, the adhesive tape with a high-strength foam base is not satisfactory in conformability to a step of an adherend and is vulnerable to water intrusion from the outside.

With larger screens and smaller thickness of portable electronic terminals and application of organic EL information display devices to portable electronic terminals, the area to which the adhesive tape is attached is becoming smaller and the adhesive tape is becoming narrower. In such a situation, there is a demand for adhesive tapes having satisfactory conformability to a high step of an adherend while maintaining high impact resistance and having removable performance that enables organic EL information display devices to be easily removed, for example, when electronic devices are disassembled.

SUMMARY

One or more embodiments of the present invention are to provide an adhesive tape having satisfactory conformability to a high step of an adherend while maintaining high impact resistance and having removable performance that enables easy peeling when articles such as electronic devices are disassembled.

One or more embodiments of the present invention are achieved as follows. One or more embodiments of the present invention provide an adhesive tape having an adhesive layer on one side or both sides of a foam base directly or with another layer interposed therebetween, in which the foam base has a tensile strength of 650 N/cm$^2$ or more in a flow direction, the foam base has a compressive strength at 25% of 1000 kPa or less, and the foam base has a density of 0.35 g/cm$^3$ to 0.90 g/cm$^3$.

One or more embodiments of the present invention provide an adhesive tape having an adhesive layer on one side or both sides of a foam base directly or with another layer interposed therebetween, in which the foam base has a tensile strength of 650 N/cm$^2$ or more in a stretching direction of the adhesive tape, the foam base has a compressive strength at 25% of 1000 kPa or less, and the foam base has a density of 0.35 g/cm$^3$ to 0.90 g/cm$^3$.

In the adhesive tape according to one or more embodiments of the present invention, the foam base may have a tensile strength of 450 N/cm$^2$ or more in a width direction. In the adhesive tape of one or more embodiments of the present invention, the foam base may have a tensile strength of 450 N/cm$^2$ or more in a direction orthogonal to the stretching direction of the adhesive tape.

In the adhesive tape of one or more embodiments of the present invention, the foam base may have a tensile stress of 450 N/cm$^2$ or less at 100% strain based on a stress-strain curve in the flow direction. The foam base may have a tensile stress of 450 N/cm² or less at 100% strain based on a stress-strain curve in the stretching direction of the adhesive tape.

In the adhesive tape of one or more embodiments of the present invention, the adhesive layer may contain filler particles. In this case, the amount of the filler particles contained in the adhesive layer may be less than 20 parts by mass per 100 parts by mass of the adhesive resin.

In the adhesive tape of one or more embodiments of the present invention, the foam base may have a thickness in a range of 50 μm to 500 μm.

In the adhesive tape of one or more embodiments of the present invention, the foam base may contain an elastomer resin as a main component.

In the adhesive tape of one or more embodiments of the present invention, the adhesive layer may have a tensile stress of 25 N/cm² or less at 100% strain based on a stress-strain curve.

The adhesive tape of one or more embodiments of the present invention may be used for bonding members that constitute an electronic device.

One or more embodiments of the present invention can provide an adhesive tape having satisfactory conformability to a high step of an adherend while maintaining high impact resistance and having removable performance that enables easy peeling, for example, when electronic devices are disassembled.

DETAILED DESCRIPTION OF THE EMBODIMENTS

I. Adhesive Tape

An adhesive tape of one or more embodiments of the present invention has an adhesive layer on one side or both sides of a foam base directly or with another layer interposed therebetween, in which the foam base has a tensile strength of 650 N/cm² or more in a flow direction, the foam base has a compressive strength at 25% of 1000 kPa or less, and the foam base has a density of 0.35 g/cm³ to 0.90 g/cm³.

In other words, the adhesive tape of one or more embodiments of the present invention has an adhesive layer on one side or both sides of a foam base directly or with another layer interposed therebetween, in which the foam base has a tensile strength of 650 N/cm² or more in a stretching direction of the adhesive tape, the foam base has a compressive strength at 25% of 1000 kPa or less, and the foam base has a density of 0.35 g/cm³ to 0.90 g/cm³.

Figure 1:
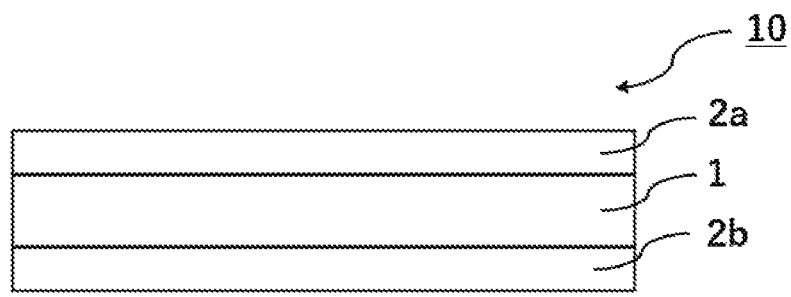
FIG. 1 is a schematic cross-sectional view of an example of an adhesive tape according to one or more embodiments of the present invention.

FIG. 1 is a schematic cross-sectional view of an example of the adhesive tape according to one or more embodiments of the present invention. An adhesive tape 10 of one or more embodiments of the present invention illustrated in FIG. 1 has an adhesive layer 2a disposed on one side of a foam base 1 and an adhesive layer 2b disposed on the other side of the foam base 1. The foam base 1 has at least predetermined physical properties.

The adhesive tape of one or more embodiments of the present invention has an adhesive layer on one side or both sides of a foam layer that satisfies predetermined physical properties, thereby exhibiting satisfactory conformability to a high step of an adherend while maintaining high impact resistance. The adhesive tape of one or more embodiments of the present invention is stretched at a desired angle to an adherend surface when articles such as electronic devices are disassembled, thereby exhibiting removable performance that enables easy peeling without tearing or leaving adhesive residue on the adherend surface during the peeling process.

Here, the adhesive tape of one or more embodiments of the present invention is an adhesive tape that can be peeled off by stretching (stretchy peelable tape), in which the adhesive tape can be removed from the adherend by pulling and elongating one end at a predetermined angle to the adherend surface to decrease the area of adhesion to the adherend. In the adhesive tape of one or more embodiments of the present invention, therefore, one end of the adhesive tape is pulled at a predetermined angle to the adherend surface in an article having a pair of members bonded through the adhesive tape, whereby the adhesive tape is elongated and deformed and the adhesive tape can be peeled off from one or both of the members. A pair of members is thus removable.

The tensile angle (which may be referred to as the angle in the stretching direction) when the adhesive tape of one or more embodiments of the present invention attached to the adherend is stretched can be, for example, 0° to 180° relative to the adherend surface (bonded surface) of the adherend. In particular, the horizontal direction to the vertical direction relative to the bonded surface of the adherend, that is, the tensile angle of 0° to 90° is preferred, and 0° to 45° is more preferred. As used herein "the tensile angle when the adhesive tape is stretched" refers to the angle that the direction in which one end of a pair of ends of the adhesive tape is pulled with the other end fixed to the adherend surface forms with the adherend surface of the adherend to which the adhesive tape is attached. When the adhesive tape of one or more embodiments of the present invention has adhesive layers on both sides of the foam base and members are attached to both sides of the adhesive tape, assuming that the adherend surface of a member attached to one side of the adhesive tape is a reference surface, the tensile angle is the angle that the adhesion surface of the adhesive tape in contact with the reference surface forms with the reference surface when the adhesive tape is stretched. A pair of ends of the adhesive tape can be set as appropriate according to the shape or the like. When the adhesive tape is rectangular, a pair of ends may be both ends located in the longitudinal direction (length direction).

1. Foam Base

The foam base in one or more embodiments of the present invention at least has a tensile strength in the flow direction, a compressive strength at 25%, and a density within respective predetermined ranges.

In other words, the foam base in one or more embodiments of the present invention has a tensile strength in the stretching direction of the adhesive tape, a compressive strength at 25%, and a density within respective predetermined ranges.

(1) Physical Properties and Characteristics

The foam base in one or more embodiments of the present invention has a tensile strength of 650 N/cm$^2$ or more in the flow direction. When the tensile strength in the flow direction of the foam base falls within the above range, a strength that prevents tearing of the foam base and the adhesive tape can be ensured when the adhesive tape of one or more embodiments of the present invention is stretched and removed.

The tensile strength in the flow direction of the foam base may be 650 N/cm$^2$ or more. In particular, 700 N/cm$^2$ or more is preferred. The upper limit of the tensile strength in the flow direction of the foam base is not limited but may be equal to or less than 3,500 N/cm$^2$, which is the possible upper limit of common foam bases. The upper limit may be 1,500 N/cm$^2$ or less, or 1,480 N/cm$^2$ or less in terms of enhancing flexibility and impact resistance. More specifically, a range of the tensile strength in the flow direction of the foam base may be 650 N/cm$^2$ to 1,500 N/cm$^2$, or 700 N/cm$^2$ to 1,500 N/cm$^2$. When the tensile strength in the flow direction of the foam base falls within the above range, a strength that prevents tearing of the foam base and the adhesive tape can be well ensured when the adhesive tape of one or more embodiments of the present invention is stretched and removed, and flexibility necessary for conformability to steps can be ensured.

The tensile strength in the width direction of the foam base is not limited but may be 450 N/cm$^2$ or more, 470 N/cm$^2$ to 1,200 N/cm$^2$, or 500 N/cm$^2$ to 1,000 N/cm$^2$. When the tensile strength in the width direction of the foam base falls within the above range, a strength that makes the adhesive tape resistant to tearing during removal can be well ensured, and flexibility necessary for conformability to steps can be ensured.

In one or more embodiments of the present invention, in particular, the flow direction of the foam base corresponds to the stretching direction of the adhesive tape, whereby the effect of ensuring a strength that prevents tearing of the foam base and the adhesive tape is remarkably achieved when the adhesive tape of one or more embodiments of the present invention is stretched and removed. The tensile strength of the foam base in the stretching direction of the adhesive tape may be referred to as the tensile strength in the stretching direction of the foam base. In this case, the direction orthogonal to the stretching direction of the adhesive tape can correspond to the width direction of the foam base. When the adhesive tape is rectangular, the stretching direction may be the same as the longitudinal direction of the adhesive tape.

That is, in one or more embodiments of the present invention, the tensile strength of the foam base in the stretching direction of the adhesive tape (tensile strength in the stretching direction of the foam base) may be 650 N/cm$^2$ or more. In particular, 700 N/cm$^2$ or more is preferred. On the other hand, the upper limit of the tensile strength in the stretching direction of the foam base is not limited but may be equal to or less than 3,500 N/cm$^2$, which is the possible upper limit of common foam bases. The upper limit may be 1,500 N/cm$^2$ or less, or 1,480 N/cm$^2$ or less in terms of enhancing flexibility and impact resistance. More specifically, a range of the tensile strength in the stretching direction of the foam base may be 650 N/cm$^2$ to 1,500 N/cm$^2$ or 700 N/cm$^2$ to 1,500 N/cm$^2$. When the tensile strength in the stretching direction of the foam base falls within the above range, a strength that makes the foam base and the adhesive tape resistant to tearing can be well ensured when the adhesive tape of one or more embodiments of the present invention is stretched and removed, and flexibility necessary for conformability to steps can be ensured.

The tensile strength of the foam base in the direction orthogonal to the stretching direction of the adhesive tape is not limited but may be 450 N/cm$^2$ or more, 470 N/cm$^2$ to 1,200 N/cm$^2$, or 500 N/cm$^2$ to 1,000 N/cm$^2$. A strength that makes the adhesive tape resistant to tearing during removal can be well ensured, and flexibility necessary for conformability to steps can be ensured.

The tensile strength in each direction of the foam base can be adjusted as appropriate by selecting the material of the foam used as the foam base and by drawing the foam base in the production step.

The foam base in one or more embodiments of the present invention has a compressive strength at 25% of 1,000 kPa or less. When the compressive strength at 25% of the foam base falls within the above range, the adhesive tape of one or more embodiments of the present invention can have satisfactory conformability to an adherend and have high water resistance. The compressive strength at 25% of the foam base may be 1,000 kPa or less. In particular, 800 kPa or less is preferred and 500 kPa or less is further preferred. The lower limit of the compressive strength at 25% of the foam base is not limited as long as it has a magnitude to enable the adhesive tape of one or more embodiments of the present invention to achieve both of conformability and removability by elongation, and may be 30 kPa or more. In particular, 50 kPa or more is preferred, 90 kPa or more is further preferred, and 100 kPa or more is more preferred. More specifically, a range of the compressive strength at 25% of the foam base can be 30 kPa to 1000 kPa, 50 kPa to 800 kPa, or 100 kPa to 500 kPa. When the compressive strength at 25% of the foam base falls within the above range, the adhesive tape of one or more embodiments of the present invention can more easily conform particularly to an adherend with uneven shapes or coarse surfaces and can exhibit high adhesive strength and water resistance.

The compressive strength at 25% of the foam base was measured in accordance with JIS K6767. Specifically, a sample cut into a 25 mm square is attached to a stainless steel plate with a larger area than the sample, and the strength is measured when the sample is compressed by 25% of its initial thickness at a rate of 0.5 mm/min using a stainless probe with a diameter of 7 mm at 23° C. and 50% RH.

The density of the foam base in one or more embodiments of the present invention is 0.35 g/cm$^3$ to 0.90 g/cm$^3$. When the density of the foam base falls within the above range, the adhesive tape of one or more embodiments of the present invention can exhibit high impact resistance, and a strength that makes the foam and the adhesive tape resistant to tearing can be guaranteed during removal by stretching. With this configuration, the adhesive tape of one or more embodiments of the present invention can be elongated sufficiently and achieves satisfactory removability with less adhesive residue on the adherend surface. Furthermore, when the density of the foam base falls within the above range, removability by elongation and high flexibility necessary for conformability to steps can be exhibited.

The density of the foam base may be 0.90 g/cm$^3$ or less, but 0.80 g/cm$^3$ or less to achieve high impact resistance, removability by stretching, and flexibility necessary for conformability, 0.70 g/cm³ or less, or 0.60 g/cm³ or less. The density of the foam base may be 0.35 g/cm³ or more, but 0.40 g/cm³ or more, 0.45 g/cm³ or more, or 0.50 g/cm³ or more to achieve higher impact resistance, removability by stretching, and flexibility necessary for conformability.

The density of the foam base is apparent density measured in accordance with JISK6767 and refers to a value calculated based on the mass and the volume of approximately 15 cm³ of a foam cut into a 4 cm×5 cm rectangular piece.

The elongation at break of the foam base, that is, the tensile elongation at break in a tensile test, is not limited, and the elongation at break in the flow direction of the foam base can be, for example, 200% or more. In particular, 300% or more is preferred, 400% or more is further preferred, and 500% or more is more preferred, and 600% or more is particularly preferred. The elongation at break in the flow direction of the foam base can be 3000% or less. In particular, 2500% or less is preferred, 2000% or less is further preferred, 1500% or less is more preferred, and 1200% or less is particularly preferred. More specifically, a range of the elongation at break in the flow direction of the foam base may be 200% to 1,500%, 300% to 1,200%, or 500% to 1,200%. When the elongation at break in the flow direction falls within the above range, deterioration in workability and reduction in easiness of attachment work of the adhesive tape can be suppressed even with a foamed flexible base. In addition, excessive increase in stress in stripping off the adhesive tape from the adherend can be suppressed, and excessive increase in stretching distance can be suppressed to enable removal work in a small space.

The elongation at break in the flow direction of the foam base can be, for example, 200% or more. In particular, 300% or more is preferred, 400% or more is further preferred, and 500% or more is more preferred, and 600% or more is particularly preferred. The elongation at break in the width direction of the foam base can be 3000% or less. In particular, 2500% or less is preferred, 2000% or less is further preferred, 1500% or less is more preferred, and 1200% or less is particularly preferred. More specifically, a range of the elongation at break in the width direction of the foam base may be 200% to 1,500%, 300% to 1,200%, or 500% to 1,200%. When the elongation at break in the width direction falls within the above range, deterioration in workability and reduction in easiness of attachment work of the adhesive tape can be suppressed even with a foamed flexible base. In addition, stress increase in stripping off the adhesive tape from the adherend can be suppressed, and excessive increase in stretching distance can be suppressed to enable work in a small space.

As described above, in one or more embodiments of the present invention, in particular, since the flow direction of the foam base corresponds to the stretching direction of the adhesive tape to remarkably achieve the effect of one or more embodiments of the present invention, the elongation at break of the foam base in the stretching direction of the adhesive tape can be 200% or more. In particular, 300% or more is preferred, 400% or more is further preferred, 500% or more is more preferred, and 600% or more is particularly preferred. On the other hand, the elongation at break of the foam base in the stretching direction of the adhesive tape can be less than 3000%. In particular, 2500% or less is preferred, 2000% or less is further preferred, 1500% or less is more preferred, and 1200% or less is particularly preferred. More specifically, the elongation at break of the foam base in the stretching direction of the adhesive tape may be 200% to 1,500%, 300% to 1,200%, or 500% to 1,200%. Within the above range, deterioration in workability and reduction in easiness of attachment work of the adhesive tape can be suppressed even with a foamed flexible base. In addition, stress increase in stripping off the adhesive tape from the adherend can be suppressed, and excessive increase in stretching distance can be suppressed to enable removal work in a small space.

The elongation at break of the foam base in the direction orthogonal to the stretching direction of the adhesive tape can be, for example, 200% or more. In particular, 300% or more is preferred, 400% or more is further preferred, and 500% or more is more preferred, and 600% or more is particularly preferred. On the other hand, the elongation at break of the foam base in the direction orthogonal to the stretching direction of the adhesive tape can be less than 3000%. In particular, 2500% or less is preferred, 2000% or less is further preferred, 1500% or less is more preferred, and 1200% or less is particularly preferred. More specifically, the elongation at break of the foam base in the direction orthogonal to the stretching direction of the adhesive tape may be 200% to 1,500%, 300% to 1,200%, or 500% to 1,200%. Within the above range, deterioration in workability and reduction in easiness of attachment work of the adhesive tape can be suppressed even with a foamed flexible base. In addition, stress increase in stripping off the adhesive tape from the adherend can be suppressed, and excessive increase in stretching distance can be suppressed to enable work in a small space.

The tensile strength and the elongation at break in each direction of the foam base were measured in accordance with JISK6767. Specifically, the maximum strength in tensile measurement of a test piece of the foam base cut with a gauge length of 2 cm and a width of 1 cm with a Tensilon tensile tester at a pulling speed of 300 mm/min at 23° C. and 50% RH was defined as the tensile strength. The elongation measured at break in tensile measurement by the above method was defined as the elongation at break. The tensile strength and the elongation at break in the flow direction of the foam base were measured using a test piece cut to have a gauge length in the flow direction of the foam base such that the flow direction of the foam base was the pulling direction. The tensile strength and the elongation at break in the width direction of the foam base were measured using a test piece cut to have a gauge length in the width direction of the foam base such that the width direction of the foam base was the pulling direction.

The tensile stress of the foam base in one or more embodiments of the present invention at 100% strain based on a stress-strain curve in the flow direction is not limited as long as the adhesive tape is stretchable and can be, for example, 500 N/cm² or less. In particular, 450 N/cm² or less is preferred, 150 N/cm² or less is further preferred, and 100 N/cm² or less is more preferred. Similarly, the tensile stress at 100% strain based on a stress-strain curve in the stretching direction of the adhesive tape is not limited as long as the adhesive tape is stretchable and can be, for example, 500 N/cm² or less. In particular, 450 N/cm² or less is preferred, 150 N/cm² or less is further preferred, and 100 N/cm² or less is more preferred. When the tensile stress at 100% strain based on a stress-strain curve of the foam base falls within this range, the resistance at the beginning of stretching (initial stretching) is reduced and the removability can be further enhanced.

In more detail, when the tensile strength in the flow direction of the foam base is 650 N/cm² or more, or 700 N/cm² or more, and the tensile stress at 100% strain based on a stress-strain curve in the flow direction is 450 N/cm² or less, 150 N/cm² or less, or 100 N/cm² or less, a strength that makes the foam base and the adhesive tape resistant to tearing can be well ensured when the adhesive tape of one or more embodiments of the present invention is stretched and removed, and the initial stretching resistance can be reduced to enhance the removability. This is applicable to the tensile strength and the tensile stress at 100% strain based on a stress-strain curve of the foam base in the stretching direction of the adhesive tape.

The lower limit of the tensile stress at 100% strain based on a stress-strain curve of the foam base in the flow direction and/or in the stretching direction of the adhesive tape is not limited as long as a strength that prevents tearing of the foam base in the initial stage of stretching is exhibited, and can be, for example, 10 N/cm$^2$ or more. In particular, 20 N/cm$^2$ or more is preferred, 30 N/cm$^2$ or more is further preferred, and 40 N/cm$^2$ or more is more preferred.

The tensile stress at 100% strain based on a stress-strain curve of the foam base refers to a stress at 100% strain in a stress-strain curve (called S-S curve) measured by performing a tensile test of a test piece made of the foam base with a gauge length of 2 cm and a width of 1 cm at a pulling speed of 300 mm/min using a tensile tester in a measurement environment of a temperature of 23° C. and a humidity of 50%. The tensile stress based on a stress-strain curve at 100% strain in the flow direction of the foam base was measured using a test piece cut so that the flow direction of the foam base was the gauge mark direction of the test piece.

The foam base in one or more embodiments of the present invention may have a thickness of 50 µm or more, 100 µm or more, or 150 µm or more in order to keep a balance between impact resistance, conformability, and strength of the tape in removal by stretching. The upper limit of the thickness of the foam base is not limited and can be set, for example, according to purposes and the size of articles to which the adhesive tape is applied. Specifically, the thickness of the foam base may be in a range of 50 µm to 500 µm, in a range of 100 µm to 400 µm, or in a range of 150 µm to 300 µm. When the thickness of the foam base falls within the above range, the adhesive tape exhibits satisfactory conformability and impact resistance, can be stretched without tearing when peeled off by elongation, and can be easily peeled off from the adherend. In addition, the increase in thickness of articles to which the adhesive tape is applied, especially electronic devices that are required to be more compact, can be reduced, and the design and portability of electronic devices can be improved.

The thickness of the foam base is the average of the thicknesses measured at five locations at 100 mm intervals in the length direction and can be measured, for example, using Dial Thickness Gauge type G (from OZAKI MFG. CO., LTD.).

The characteristics of the foam base described above (density, compressive strength, and tensile strength, elongation at break, etc.) can be adjusted as appropriate depending on the material used to form the foam base material, the foam structure, and the degree of drawing in producing the foam base.

The foam base in one or more embodiments of the present invention is not limited as long as it has the characteristics described above and may have an open-cell foam structure or a closed-cell foam structure. In particular, a closed-cell foam structure is preferred to exhibit higher impact resistance. The foam base may be a monolayer structure or may be a multilayer structure having two or more layers.

The foam base may be subjected to surface treatment such as corona treatment, flame treatment, plasma treatment, hot air treatment, ozone/ultraviolet treatment, or application of an adhesion-improving agent in order to enhance adhesiveness to the adhesive layer or another layer. In the surface treatment, the wetting index with a wetting reagent may be set to 36 mN/m or more, 40 mN/m or more, or 50 mN/m or more to achieve satisfactory adhesiveness to the adhesive layer. The foam base with enhanced adhesiveness may be laminated with the adhesive layer in a continuous process. The foam base with enhanced adhesiveness may be temporarily rolled up and stored and then laminated with the adhesive layer later in a separate process. When the foam base is temporarily rolled up, the foam base may be rolled with a slip sheet such as paper or a polyethylene, polypropylene, or polyester film in order to prevent blocking of the foam base with enhanced adhesiveness. A polypropylene film or a polyester film with a thickness of 25 µm or less is preferred.

(2) Composition

The resin that constitutes the foam base is any resin that can produce a foam base capable of achieving the physical properties described above and examples include polyolefin resins, polyurethane resins, rubber resins such as natural rubber and elastomers, and acrylic resins. Among those, the foam base may contain a polyolefin resin or a rubber resin as a main component, and in particular, may contain a polyolefin resin or a thermoplastic elastomer resin as a main component. When these resins are used as a main component, the flexibility and the mechanical strength of the foam base can be easily achieved, and the adhesive tape as a whole can exhibit high conformability and impact resistance and can be removed without tearing when the tape is stretched. The main component in the foam base means a resin component that is contained most abundantly in the total amount of resins that constitute the foam base. Specifically, the main component refers to a resin component that may be contained in amount of 50% by mass or more, 80% by mass or more, 90% by mass or more, or 95% by mass or more of the total amount of resins.

<Polyolefin Resin>

A form of the foam base in one or more embodiments of the present invention may be a polyolefin resin foam containing a polyolefin resin as a main component because it is superior in conformability to uneven surfaces of an adherend, high cushioning properties, and the like. The polyolefin resin that constitutes the polyolefin foam is a thermoplastic resin, and examples include, but not limited to, polyethylene resins, polypropylene resins, ethylene-propylene copolymer resins, and ethylene-vinyl acetate copolymers. In particular, the use of polyethylene resins is preferred since they are easily produced with a uniform thickness and easily impart suitable flexibility. Specifically, the amount of polyethylene resin in the polyolefin resin may be 40% by mass or more, 50% by mass or more, 60% by mass or more, or 100% by mass.

As the polyethylene resin, a polyethylene resin obtained using a metallocene compound containing a tetravalent transition metal as a polymerization catalyst has a narrow molecular weight distribution and, in the case of a copolymer, the copolymer components are introduced at substantially the same ratio in any molecular weight component, so that the polyolefin foam can be uniformly crosslinked. Thus, since the foam sheet is uniformly crosslinked, the foam sheet is easily drawn uniformly, if necessary, and the resulting polyolefin resin foam is likely to have a uniform thickness as a whole.

The polyolefin resin may contain a polyolefin resin other than the polyethylene resin obtained using a metallocene compound containing a tetravalent transition metal as a polymerization catalyst. Examples of such polyolefin resins include polyethylene resins other than the one described above and polypropylene resins. The polyolefin resins may be used alone or in combination of two or more.

Examples of such polyethylene resins include linear low-density polyethylene, low-density polyethylene, medium-density polyethylene, high-density polyethylene, ethylene-α-olefin copolymers containing 50% by mass or more of ethylene, and ethylene-vinyl acetate copolymers containing 50% by mass or more of ethylene. These may be used alone or in combination of two or more. Examples of α-olefin that constitutes the ethylene-α-olefin copolymers include propylene, 1-butene, 1-pentene, 4-methyl-1-pentene, 1-hexene, 1-heptene, and 1-octene.

Examples of the polypropylene resins include, but not limited to, polypropylene and propylene-α-olefin copolymers containing 50% by mass or more of propylene. These may be used alone or in combination of two or more. Examples of α-olefin that constitutes the propylene-α-olefin copolymers include ethylene, 1-butene, 1-pentene, 4-methyl-1-pentene, 1-hexene, 1-heptene, and 1-octene.

<Rubber Resin>

A form of the foam base in one or more embodiments of the present invention may be a rubber resin foam containing a rubber resin as a main component. Examples of the rubber resin that constitutes the rubber resin foam include, but not limited to, natural rubber, thermoplastic elastomer resins, and thermosetting elastomer resins. These rubber resins may be used singly or in combination of two or more.

Among those, the foam base contains an elastomer resin as a main component, and may contain a thermoplastic elastomer resin as a main component.

Both non-crosslinked elastomers and crosslinked elastomers can be used as the thermoplastic elastomer resins. Non-crosslinked elastomers are preferred in terms of effectively enhancing cushioning properties.

The thermoplastic elastomer resins may be a hydrogenated thermoplastic elastomer formed by hydrogenating a polymer that constitutes a thermoplastic elastomer. Specific examples of the hydrogenated thermoplastic elastomer include hydrogenated styrenic thermoplastic elastomers such as SEBC and hydrogenated olefinic thermoplastic elastomers such as CEBC, as described later.

The thermoplastic elastomer resins are not limited as long as they can form a foam base that satisfies the desired physical properties. Examples include olefinic thermoplastic elastomers, acrylic thermoplastic elastomers, urethane thermoplastic elastomers, styrenic thermoplastic elastomers, silicone thermoplastic elastomers, ester thermoplastic elastomers, vinyl chloride thermoplastic elastomers, and amide thermoplastic elastomers. Among those, olefinic thermoplastic elastomers or styrenic thermoplastic elastomers are preferred, and olefinic thermoplastic elastomers are more preferred because they are particularly superior in conformability to uneven surfaces of an adherend and in cushioning properties.

(Olefinic Thermoplastic Elastomer Resin)

The olefinic thermoplastic elastomer resins have polyolefins in the hard segment and rubber components and/or non-crystalline polyethylene in the soft segment. The olefinic thermoplastic elastomer resins may be a simple blend of a polyolefin and a rubber component, a dynamically vulcanized type in which partial crosslinking or full crosslinking is introduced into a rubber component by a method such as dynamic vulcanization, or a polymerized type.

Examples of the polyolefin that constitutes the hard segment of the olefinic thermoplastic elastomer resins include a homopolymer of α-olefin having 1 to 4 carbon atoms or a copolymer of two or more α-olefins. Specific examples include thermoplastic crystalline polyolefins such as polypropylene and polyethylene. Examples of the rubber component that constitute the soft segment include fully or partially vulcanized rubbers. Examples include butyl rubber, halobutyl rubber, ethylene-propylene rubber (EPM), ethylene-propylene-diene rubber (EPDM), ethylene-vinyl acetate copolymers, polybutene, polyisobutylene, chlorinated polyethylene, acrylonitrile-butadiene rubber, NBR, and natural rubber. Among those, ethylene-propylene rubber (EPM) and ethylene-propylene-diene rubber (EPDM) are preferred.

The olefinic thermoplastic elastomer resins may be block copolymers. Examples of the block copolymers of the olefinic thermoplastic elastomer resins include those having crystalline blocks and soft segment blocks. Examples include crystalline olefin block-ethylene/butylene copolymer-crystalline olefin block copolymer (CEBC). In CEBC, the crystalline olefin that constitutes the crystalline block may be crystalline ethylene.

(Styrenic Thermoplastic Elastomer)

Examples of the styrenic thermoplastic elastomers include block copolymers having a polymer or a copolymer block of styrene and a polymer or a copolymer block of a conjugated diene compound, and hydrogenated products thereof. Examples of the conjugated diene compound include isoprene and butadiene.

The styrenic thermoplastic elastomers may or may not be hydrogenated. In the case of hydrogenation, hydrogenation can be performed by known methods.

More specific examples of the styrenic thermoplastic elastomers include styrene-isoprene block copolymers (SI), styrene-isoprene-styrene block copolymers (SIS), styrene-butadiene block copolymers (SBR), styrene-butadiene-styrene block copolymers (SBS), styrene-ethylene/butylene-styrene block copolymers (SEBS), styrene-ethylene/propylene-styrene block copolymers (SEPS), styrene-ethylene/butylene block copolymers (SEB), styrene-ethylene/propylene block copolymers (SEP), styrene-ethylene/butylene-crystalline olefin block copolymers (SEBC), and styrene-isobutylene-styrene block copolymer (SIBS).

(Other Resin Components)

When the resin that constitutes the foam base is a mixture of a thermoplastic elastomer resin as a main component and other resin components, the other resin components can be selected as appropriate, for example, in consideration of miscibility with the elastomer. Examples of the other resin components include polyolefin resins, polystyrene resins, polyethylene terephthalate resins, and nylon resins. Examples of the polyolefin resins include polyethylene resins, polypropylene resins, and ethylene-vinyl acetate copolymers. Among those, polyethylene resins are preferred.

<Optional Components>

The foam base in one or more embodiments of the present invention at least contains a resin and may contain, if necessary, a colorant, a plasticizer, an antioxidant, a foaming aid such as zinc oxide, a bubble nucleation adjuster, a heat stabilizer, a flame retardant such as aluminum hydroxide and magnesium hydroxide, an antistatic agent, glass and plastic hollow balloons/beads, a filler such as metal powders and metal compounds, a conductive filler, a heat conductive filler, and the like, to an extent that does not impair the physical properties of the foam base. These optional components will be described below in the section on the production method for the foam base.

(3) Production Method for Foam Base

The foam base in one or more embodiments of the present invention can be produced using known methods for producing foams. One non-limiting example is a method at least including a foamable resin sheet forming step of forming a foamable resin composition at least containing a resin component and a foaming agent into a sheet to produce a foamable resin sheet, and a foaming step of foaming the foamable resin sheet to form a foam base.

The foamable resin composition at least contains a resin and a foaming agent. The resin is the same as the resin of the foam base described above. For example, one example of the foamable resin composition for producing a polyolefin foam is a composition at least containing a polyolefin resin containing 40% by mass or more of a polyethylene resin obtained using a metallocene compound containing a tetravalent transition metal as a polymerization catalyst, and a thermal decomposition-type foaming agent.

A thermal decomposition-type foaming agent for use in production of a resin foam can be used as the foaming agent. Examples include organic foaming agents such as azo compounds, nitroso compounds, hydrazine derivatives, and semicarbazide compounds, and inorganic foaming agents such as acid ammonium, sodium carbonate, ammonium bicarbonate, sodium bicarbonate, ammonium nitrite, sodium borohydride, and anhydrous monosodium citrate. The amount of the foaming agent added in the foamable resin composition can be determined as appropriate according to the expansion ratio of the foam base, and the amount added may be 1 part by mass to 40 parts by mass, or 1 part by mass to 30 parts by mass per 100 parts by mass of the resin.

The foamable resin composition may contain a colorant according to the design, light shielding effect, concealing effect, light reflectivity, and light resistance required for the foam base and the adhesive tape including the foam base. For example, when light shielding effect and concealing effect are required, the foamable resin composition may contain a black colorant. Examples of the black colorant that can be used include carbon black, graphite, copper oxide, manganese dioxide, aniline black, perylene black, titanium black, cyanine black, activated carbon, ferrite, magnetite, chromium oxide, iron oxide, molybdenum disulfide, chromium complex, complex oxide-based black dyes, and anthraquinone-based organic black dyes. Among these, carbon black is preferred in terms of cost, availability, insulation, and heat resistance to withstand the temperatures in extrusion and heat foaming processes of the foamable polyolefin resin composition.

When design, light reflectivity, light resistance, and the like are required, the foamable resin composition may contain a white colorant. Examples of the white colorant that can be used include inorganic white colorants such as titanium dioxide, zinc oxide, aluminum oxide, silicon oxide, magnesium oxide, zirconium oxide, calcium oxide, tin oxide, barium oxide, cesium oxide, yttrium oxide, magnesium carbonate, calcium carbonate, barium carbonate, zinc carbonate, aluminum hydroxide, magnesium hydroxide, calcium hydroxide, zinc hydroxide, aluminum silicate, calcium silicate, barium sulfate, calcium sulfate, barium stearate, zinc oxide, talc, silica, alumina, clay, kaolin, titanium phosphate, mica, gypsum, white carbon, diatomaceous earth, bentonite, lithopone, zeolite, and sericite, and organic white colorants such as silicone resin particles, acrylic resin particles, urethane resin particles, and melamine resin particles. Among those, aluminum oxide and zinc oxide are preferred in terms of cost, availability, color tone, and heat resistance to withstand the temperatures in extrusion and heat foaming processes of the foamable polyolefin resin composition.

The foamable resin composition may contain, if necessary, other components such as a plasticizer, an antioxidant, a foaming aid such as zinc oxide, a bubble nucleation adjuster, a heat stabilizer, a flame retardant such as aluminum hydroxide and magnesium hydroxide, an antistatic agent, glass and plastic balloons/beads, a filler such as metal powders and metal compounds, a conductive filler, and a heat conductive filler to an extent that does not impair the physical properties of the foam base.

In order to keep moderate conformability, cushioning properties, and elongation properties of the foam base, the respective amounts of the colorant and other components may be 0.1% by mass to 10% by mass of the resin, or 1% by mass to 7% by mass.

When the colorant, the thermal decomposition-type foaming agent, the foaming aid, and the like are blended in the foamable resin composition, it is preferable to produce a masterbatch in advance with the foamable resin composition or a thermoplastic resin with high miscibility with the foamable resin composition before being supplied to the extruder, in terms of preventing color irregularities, partial over foaming, and under foaming.

The foamable resin sheet is produced by forming the foamable resin composition into a sheet shape and corresponds to a precursor of the foam base. In the foamable resin sheet forming step, the foam resin sheet is produced, for example, by feeding the foamable resin composition to an extruder, melting and kneading the composition, and extruding a sheet from the extruder.

In the foaming step, the foamable resin sheet can be foamed by any method selected as appropriate according to the purpose. Examples of the method include heating by hot air, heating by infrared rays, using salt bath, and using oil bath, and these methods may be used in combination. Among these methods, heating by hot air and heating by infrared rays are preferred because if so, there is little difference between the front side and the back side in the appearance of the foam surfaces.

The method of producing the foam base may include a crosslinking step of crosslinking the foamable resin sheet between the foamable resin sheet forming step and the foaming step. In particular, when an olefin foam is produced, the foamable polyolefin resin sheet may be crosslinked.

In the crosslinking step, the foamable resin sheet is crosslinked by any method, for example, by irradiating the foamable resin sheet with ionizing radiation, or by blending an organic peroxide in advance in the foamable resin composition before forming a foamable resin sheet, and heating the resulting foamable resin sheet to decompose the organic peroxide. These methods may be used in combination.

Examples of the ionizing radiation include electron beams, alpha rays, beta rays, and gamma rays. The dose of ionizing radiation may be adjusted as appropriate such that the gel fraction of the foam base falls within the range above, and a range of 5 kGy to 200 kGy is preferred. The ionizing radiation may be applied to both surfaces of the foamable resin sheet, with the same dose, in order to form a uniform crosslinking structure and consequently to form a relatively uniform foam structure.

Examples of the organic peroxide that can be blended in the foamable resin composition include 1,1-bis(t-butylperoxy)3,3,5-trimethylcyclohexane, 1,1-bis(t-butylperoxy)cyclohexane, 2,2-bis(t-butylperoxy)octane, n-butyl-4,4-bis(t-butylperoxy)valerate, di-t-butyl peroxide, t-butylcumyl peroxide, dicumyl peroxide, $\alpha,\alpha'$-bis(t-butylperoxy-m-isopropyl)benzene, 2,5-dimethyl-2,5-di(t-butylperoxy)hexane, 2,5-dimethyl-2,5-di(t-butylperoxy)hexyne-3, benzoyl peroxide, cumyl peroxyneodecanoate, t-butyl peroxybenzoate, 2,5-dimethyl-2,5-di(benzoylperoxy)hexane, t-butylperoxyisopropyl carbonate, and t-butyl peroxy allyl carbonate. These may be used singly or in combination of two or more. The amount of the organic peroxide added may be 0.01 parts by mass to 5 parts by mass, or 0.1 parts by mass to 3 parts by mass per 100 parts by mass of the resin contained in the foamable resin composition.

The method of producing the foam base may include a drawing step of melting or softening the foam base and drawing the foam base in one or both of the flow direction or the width direction after the foaming step, or drawing the foamable resin sheet in one or both of the flow direction or the width direction simultaneously with the foaming step. The drawing step may be performed as necessary and may be performed multiple times.

The drawing step may be performed after completion of foaming or may be performed while the foamable resin sheet is foamed. When the drawing step is performed after the foaming step, the foam base obtained by the foaming step may be continuously drawn while the molten state at the time of foaming is kept without cooling the foam base, or the foam base may be drawn after the foam base is cooled and then the foam sheet is heated again into a molten or softened state.

Here, the molten state of the foam base refers to a state in which the foam base is heated above the melting point of the resin that constitutes the foam base. The softening of the foam base refers to a state in which the foam base is heated to a temperature equal to or more than the softening point and lower than the melting point of the resin that constitutes the foam base. The foam base is drawn so that the bubbles in the foam base are drawn and deformed in a predetermined direction, resulting in a foam with a bubble aspect ratio within a predetermined range.

The drawing direction of the foam base may be the flow direction or the width direction of the elongated foamable resin sheet or may be the flow direction and the width direction. When the foam base is drawn in the flow direction and the width direction, the foam base may be drawn in the flow direction and the width direction simultaneously or may be drawn separately in one direction.

Examples of the method of drawing the foam base in the flow direction include a method in which the foam base is drawn in the flow direction by winding up the elongated foam sheet while cooling after foaming, at a speed (take-up speed) higher than the speed of feeding the elongated foamable resin sheet to the foaming step (feed speed), and a method in which the foam base is drawn in the flow direction by winding up the foam base at a speed (take-up speed) higher than the speed of feeding the resulting foam base to the drawing step (feed speed). In the former method, since the foamable resin sheet expands in the flow direction due to its own foaming, the amount of expansion in the flow direction due to foaming of the foamable resin sheet is taken into consideration when the foam base is drawn in the flow direction, and the feed speed and the take-up speed of the foam base must be adjusted such that the foam base is drawn in the flow direction more than the amount of expansion.

A method of drawing the foam base in the width direction may be a method in which the foam base is drawn in the width direction by gripping both ends in the width direction of the foam base with a pair of grippers and gradually moving the grippers in a direction away from each other. Since the foamable resin sheet expands in the width direction due to its own foaming, the amount of expansion in the width direction due to foaming of the foamable resin sheet is taken into consideration when the foam base is drawn in the width direction, and adjustment is necessary such that the foam base is drawn in the width direction more than the amount of expansion.

The drawing ratio in the flow direction of the foam base may be 1.1 to 2.0, or 1.2 to 1.5. The drawing ratio in the width direction of the foam base may be 1.2 to 4.5, or 1.5 to 3.5.

2. Adhesive Layer

The adhesive tape of one or more embodiments of the present invention can be used with an adhesive layer on one side or both sides of the foam base directly or with another layer interposed therebetween.

(1) Composition

The adhesive that can be used to form the adhesive layer is not limited as long as it at least contains an adhesive resin as a main component. For example, an acrylic adhesive containing a (meth)acrylic copolymer as a main component of the adhesive resin, a urethane adhesive containing a urethane polymer as a main component of the adhesive resin, a rubber adhesive containing a rubber polymer as a main component of the adhesive resin, or a silicone adhesive containing a silicone polymer as a main component of the adhesive resin can be used.

Among those, it is preferable to select one or two more of acrylic adhesives, urethane adhesives, and rubber adhesives.

The main component of the adhesive resin refers to a resin component that may be contained most abundantly in the adhesive resin, specifically, the resin component contained in the adhesive resin in amount of 80% or more, 90% or more, 95% or more, or 99% or more.

<Acrylic Adhesive>

The acrylic adhesive at least contains an adhesive resin containing a (meth)acrylic copolymer as a main component. The acrylic adhesive can contain other components such as a tackifier resin, a crosslinking agent, and a filler, if necessary. The term (meth)acrylic means acrylic or methacrylic. The term (meth)acrylate means acrylate or methacrylate.

In the acrylic adhesive, examples of the (meth)acrylic copolymer used as the main component of the adhesive resin include, but not limited to, (meth)acrylic random copolymers and (meth)acrylic block copolymers. The (meth)acrylic random copolymers and the (meth)acrylic block copolymers may be used independently or in combination.

((Meth)Acrylic Random Copolymer)

In the acrylic adhesive, one exemplary form of the (meth)acrylic copolymer used as the main component of the adhesive resin is a (meth)acrylic random copolymer (hereinafter referred to as (meth)acrylic copolymer (A)). The acrylic adhesive can contain one or two or more (meth)acrylic random copolymers as the adhesive resin.

The (meth)acrylic copolymer (A) is obtained by polymerizing monomer components including (meth)acrylic monomers. Examples of the (meth)acrylic monomers that can be used in the production of the (meth)acrylic copolymer (A) include (meth)acrylates having an alkyl group having 1 to 12 carbon atoms, such as methyl (meth)acrylate, ethyl (meth)acrylate, n-butyl (meth)acrylate, isobutyl (meth)acrylate, t-butyl (meth)acrylate, n-hexyl (meth)acrylate, n-octyl (meth)acrylate, isooctyl (meth)acrylate, isononyl (meth)acrylate, cyclohexyl (meth)acrylate, and 2-ethylhexyl (meth)acrylate.

Among those, it is preferable to use (meth)acrylates having an alkyl group having 4 to 12 carbon atoms as the (meth)acrylic monomers, and it is more preferable to use (meth)acrylates having an alkyl group having 4 to 8 carbon atoms. It is particularly preferable to use one or both of n-butyl acrylate and 2-ethylhexyl acrylate to achieve both high adhesive strength and high conformability.

The (meth)acrylate having an alkyl group having 1 to 12 carbon atoms may be used in amount of 60% by mass or more of the total amount of monomers used in the production of the (meth)acrylic copolymer (A), may be used in a range of 80% by mass to 98.5% by mass, or may be used in a range of 90% by mass to 98.5% by mass to achieve both high adhesive strength and high conformability.

In the production of the (meth)acrylic copolymer (A), highly polar vinyl monomers can be used as monomers. As the highly polar vinyl monomers, a vinyl monomer having a hydroxyl group, a vinyl monomer having a carboxyl group, a vinyl monomer having an amide group, and the like can be used singly or in combination of two or more.

As the monomer having a hydroxyl group, for example, (meth)acrylates having a hydroxyl group such as 2-hydroxyethyl (meth)acrylate, 2-hydroxypropyl (meth)acrylate, 4-hydroxybutyl (meth)acrylate, and 6-hydroxyhexyl (meth)acrylate can be used.

As the vinyl monomer having a carboxyl group, for example, acrylic acid, methacrylic acid, itaconic acid, maleic acid, (meth)acrylic acid dimer, crotonic acid, ethylene oxide-modified succinic acid acrylate, and the like can be used. Among those, the use of acrylic acid is preferred.

As the monomer having an amide group, for example, N-vinylpyrrolidone, N-vinylcaprolactam, acryloylmorpholine, acrylamide, N,N-dimethylacrylamide, and the like can be used.

Other examples of the highly polar vinyl monomers that can be used include vinyl acetate, ethylene oxide-modified succinic acid acrylate, and 2-acrylamido-2-methylpropanesulfonic acid.

The highly polar vinyl monomers may be used in a range of 1.5% by mass to 20% by mass of the total amount of monomers used in the production of the (meth)acrylic copolymer (A), may be used in a range of 1.5% by mass to 10% by mass, or may be used in a range of 2% by mass to 8% by mass to achieve both high adhesive strength and high conformability.

When the adhesive containing a crosslinking agent described below is used, a (meth)acrylic copolymer (A) having a functional group that reacts with the functional group of the crosslinking agent may be used as the (meth)acrylic copolymer (A). An example of the functional group that the (meth)acrylic copolymer (A) may be a hydroxyl group. The hydroxyl group can be introduced into the (meth)acrylic copolymer (A), for example, by using a vinyl monomer having a hydroxyl group as the monomer. The vinyl monomer having a hydroxyl group may be used in a range of 0.01% by mass to 1.0% by mass, or in a range of 0.03% by mass to 0.3% by mass of the total amount of monomers used in the production of the (meth)acrylic copolymer (A).

The (meth)acrylic copolymer (A) used may have a weight average molecular weight of 400,000 to 3,000,000 to produce a double-sided adhesive tape having removable performance that enables easy peeling during disassemble while maintaining high impact resistance, and may have a weight average molecular weight of 700,000 to 2,500,000 to further improve impact resistance and removable performance.

The weight average molecular weight refers to a value measured by gel permeation chromatography (GPC) and converted in terms of polystyrene. Specifically, the weight average molecular weight can be measured using a GPC system (HLC-8320GPC) from Tosoh Corporation under the following conditions.

Sample concentration: 0.5% by mass (tetrahydrofuran solution)
Sample injection volume: 100 μL
Eluent: tetrahydrofuran
Flow rate: 1.0 mL/min
Measuring temperature: 40° C.
Main columns: TSKgel GMHHR-H (20)×2
Guard column: TSKgel HXL-H
Detector: differential refractometer
Weight average molecular weight of standard polystyrene: 10,000 to 20,000,000 (from Tosoh Corporation)

The (meth)acrylic copolymer (A) can be produced by polymerizing the monomers by a method such as solution polymerization, bulk polymerization, suspension polymerization, or emulsion polymerization. Solution polymerization is preferred to improve the production efficiency of the (meth)acrylic copolymer (A). An example of the solution polymerization may be radical polymerization by mixing and stirring the monomers, a known polymerization initiator, and an organic solvent at a temperature of 40° C. to 90° C. The (meth)acrylic copolymer (A) obtained by the above method may be dissolved or dispersed in an organic solvent, for example, when produced by solution polymerization.

((Meth)Acrylic Block Copolymer)

In the acrylic adhesive, another exemplary form of the (meth)acrylic copolymer used as the main component of the adhesive resin is a (meth)acrylic block copolymer (hereinafter referred to as (meth)acrylic copolymer (B)). The acrylic adhesive can contain one or two or more (meth)acrylic block copolymers as the adhesive resin.

The (meth)acrylic copolymer (B) contains two or more kinds of polymer blocks mainly composed of (meth)acrylic ester units and may be a (meth)acrylic diblock copolymer or a (meth)acrylic triblock copolymer. Among those, it is preferable to include at least a (meth)acrylic triblock copolymer.

The (meth)acrylic triblock copolymer is not limited and examples include those having a structure represented by a general formula (-[A1]-[B]-[A2]-). A1 and A2 represent an alkyl methacrylate polymer block and B represents an alkyl acrylate polymer block. A1 and A2 are independent of each other and may be the same alkyl methacrylate monomer blocks or may be alkyl methacrylate monomer blocks having different chemical structures.

Examples of alkyl methacrylate monomers that constitute the alkyl methacrylate monomer block include methyl methacrylate, ethyl methacrylate, n-propyl methacrylate, isopropyl methacrylate, isobutyl methacrylate, sec-butyl methacrylate, t-butyl methacrylate, 2-ethylhexyl methacrylate, isobornyl methacrylate, cyclohexyl methacrylate, 2-cyanoethyl methacrylate, and phenyl methacrylate. These methacrylate monomers may be used singly or in combination of two or more.

Examples of alkyl acrylate monomers that constitute the alkyl acrylate polymer block include methyl acrylate, ethyl acrylate, n-propyl acrylate, isopropyl acrylate, n-butyl acrylate, isobutyl acrylate, sec-butyl acrylate, n-tetradecyl acrylate, t-butyl acrylate, and 2-ethylhexyl acrylate. These acrylate monomers may be used singly or in combination of two or more.

The alkyl methacrylate polymer block and the alkyl acrylate polymer block may contain acrylate monomers, methacrylate monomers, or other components (constituent units) such as olefins such as ethylene and propylene, and lactones such as ε-caprolactone and valerolactone.

The (meth)acrylic triblock copolymer may be modified with functional groups such as hydroxyl groups, carboxyl groups, acid anhydride groups, amino groups, and trimethoxysilyl groups in molecular side chains or at the terminals of molecular main chains, if necessary.

Examples of the (meth)acrylic diblock copolymer include those having a structure represented by a general formula (-[A]-[B]-). The polymer block A and the polymer block B that constitute the (meth)acrylic diblock copolymer are the same as the polymer block A1 or A2 and the polymer block B in the (meth)acrylic triblock copolymer.

The weight average molecular weight Mw of the (meth)acrylic copolymer (B) may be 50,000 to 300,000, 100,000 to 250,000, or 130,000 to 230,000. The weight average molecular weight Mw of the (meth)acrylic copolymer (B) within the above range is preferred in terms of removability by elongation. The suitable range of the weight average molecular weight Mw of the (meth)acrylic triblock copolymer is the same as the above range. The weight average molecular weight Mw of the (meth)acrylic copolymer (B) can be measured in the same way as the weight average molecular weight Mw of the (meth)acrylic copolymer (A) described above.

The production method for the (meth)acrylic copolymer (B) is not limited and can be selected as appropriate from conventionally known production methods. Examples of the production method include sequential polymerization of block copolymers by anionic living polymerization or cationic living polymerization, and known methods using organometallic complexes.

(Tackifier Resin)

The acrylic adhesive used may contain a tackifier resin in order to achieve both high adhesive strength to an adherend or the foam base and high conformability, as well as to facilitate peeling of the adhesive tape by stretching.

Examples of the tackifier resin that can be used include rosin-based tackifier resins, polymerized rosin-based tackifier resins, polymerized rosin ester-based tackifier resins, rosin phenol-based tackifier resins, stabilized rosin ester-based tackifier resins, disproportionated rosin ester-based tackifier resins, hydrogenated rosin ester-based tackifier resins, terpene-based tackifier resins, terpene phenol-based tackifier resins, petroleum resin-based tackifier resins, and (meth)acrylate resin-based tackifier resins. When an emulsion-type adhesive is used as the adhesive, an emulsion-type tackifier resin may be used as the tackifier resin.

Among the tackifier resins listed above, disproportionated rosin ester-based tackifier resins, polymerized rosin ester-based tackifier resins, rosin phenol-based tackifier resins, hydrogenated rosin ester-based tackifier resins, (meth)acrylate resins, terpene phenol-based resins, and petroleum-based resins may be used singly or in combination of two or more.

It is preferable to use the tackifier resin having a softening point in a range of 30° C. to 180° C., or in a range of 70° C. to 140° C., to achieve both high adhesive strength to an adherend and the foam base and high conformability. When the (meth)acrylate tackifier resin is used, it is preferable to use a (meth)acrylate tackifier resin with a glass transition temperature of 30° C. to 200° C., or 50° C. to 160° C.

The tackifier resin may be used in a range of 5 parts by mass to 65 parts by mass per 100 parts by mass of the acrylic copolymer, or may be used in a range of 8 parts by mass to 55 parts by mass to achieve both high adhesive strength to an adherend and the foam base and high conformability.

(Crosslinking Agent)

The acrylic adhesive may contain a crosslinking agent in order to easily ensure high adhesive strength to an adherend and the foam base. For example, an isocyanate-based crosslinking agent, an epoxy-based crosslinking agent, a metal chelate-based crosslinking agent, or an aziridine-based crosslinking agent can be used as the crosslinking agent. Among those, it is preferable to use one or both of an isocyanate-based crosslinking agent and an epoxy-based crosslinking agent reactive with the acrylic polymer as the crosslinking agent. It is more preferable to use an isocyanate-based crosslinking agent.

Examples of the isocyanate-based crosslinking agent that can be used include tolylene diisocyanate, naphthylene-1,5-diisocyanate, hexamethylene diisocyanate, diphenylmethane diisocyanate, xylylene diisocyanate, and trimethylolpropane-modified tolylene diisocyanate. Tolylene diisocyanate and trimethylolpropane-modified tolylene diisocyanate are preferred.

The amount of the crosslinking agent may be selected such that the gel fraction in toluene in the adhesive layer is 40 to 80%, may be selected such that the gel fraction is 30% by mass to 70% by mass, or may be selected such that the gel fraction is 35% by mass to 65% by mass to produce an adhesive tape that achieves both high adhesive strength to an adherend and the foam base, high conformability, and the strength of the adhesive layer in peeling by stretching.

The gel fraction of the adhesive layer refers to a value measured by the method described below. First, the adhesive layer was formed by coating a release treated surface of a release liner with the adhesive to a thickness after drying of 50 μm and drying the coating at 100° C. for three minutes, followed by aging at 40° C. for two days. The adhesive layer cut into a 50 mm by 50 mm square was used as a test piece. After the mass (G1) of the test piece was measured, the test piece was immersed in toluene for 24 hours at 23° C. After the immersion, the mixture of the test piece and toluene was filtered through a 300 mesh wire cloth to extract an insoluble component in toluene. The mass (G2) of the insoluble component dried for one hour at 110° C. was measured. The gel fraction was calculated based on the mass (G1) and the mass (G2) and the following formula.

$$\text{Gel fraction}(\% \text{ by mass}) = (G2/G1) \times 100$$

<Rubber Adhesive>

The rubber adhesive at least contains an adhesive resin containing rubber and/or elastomer as a main component. The rubber adhesive can contain other components such as a tackifier resin, a crosslinking agent, and a filler, if necessary. As a form of the main component of the adhesive resin, a block copolymer of a polyaromatic vinyl compound and a conjugated diene compound can be suitably used. Specifically, styrenic resins such as styrene-isoprene-styrene copolymers, styrene-butadiene-styrene copolymers, styrene-ethylene-butylene copolymers, and styrene-ethylene-propylene copolymers can be used.

Styrene-isoprene copolymers or/and styrene-isoprene-styrene copolymers or/and mixtures of styrene-isoprene copolymers and styrene-isoprene-styrene copolymers can be used as the styrenic resins. The styrenic resins composed of such components impart high adhesive properties and retention to the adhesive tape of one or more embodiments of the present invention.

The styrenic resin may contain the structural unit represented by the following formula (1) in a range of 10% by mass to 80% by mass of the total mass of the styrene-isoprene copolymer and the styrene-isoprene-styrene copolymer, in a range of 12 to 60% by mass, in a range of 15 to 40% by mass, or in a range of 17 to 35% by mass. Thus, high adhesiveness can be achieved.

[Chem. 1]

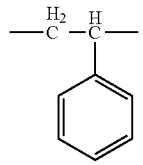

(1)

As the styrenic resin, those containing two or more copolymers with different structures can be used, and those containing the styrene-isoprene copolymer and the styrene-isoprene-styrene copolymer in combination can be used.

The styrenic resin used may contain the styrene-isoprene copolymer in a range of 0% by mass to 80% by mass of the total mass of the styrene-isoprene copolymer and the styrene-isoprene-styrene copolymer, in a range of 0% by mass to 77% by mass, in a range of 0% by mass to 75% by mass, or in a range of 0% by mass to 70% by mass. Within the above range, the adhesive tape of one or more embodiments of the present invention can achieve both high adhesion performance and thermal durability.

The weight average molecular weight of the styrene-isoprene copolymer may be in a range of 10,000 to 800,000, in a range of 30,000 to 500,000, or in a range of 50,000 to 300,000 as measured using a gel permeation chromatograph (GPC) in terms of standard polystyrene (gel permeation chromatography, SC-8020 from Tosoh Corporation, high molecular weight column TSKgel GMHHR-H, solvent: tetrahydrofuran).

The rubber adhesive can contain a tackifier resin in addition to the rubber resin described above. Examples of the tackifier resin include tackifier resins that can be contained in the acrylic adhesive described above, and petroleum resins such as C5 petroleum resins, C5/C9 petroleum resins, and alicyclic petroleum resins. Among those, the petroleum resins are miscible with the polyisoprene structure that constitutes styrenic resin, and consequently, can increase the initial adhesive strength of the adhesive tape. A range of the amount of the tackifier resin in the rubber adhesive can be the same as the range of the amount of the tackifier resin in the acrylic adhesive described above.

<Filler Particles>

The adhesive layer and the adhesive forming the same may contain one or more kinds of filler particles. When the adhesive layer contains filler particles, the filler particles are exposed from the adhesive layer when the adhesive tape is stretched, thereby reducing the area of adhesion between the adhesive layer and the adherend. Thus, even when the stretching direction of the adhesive tape is at a relatively large angle to the attached surface of the adherend (which may be referred to as "adhesion surface"), for example, in the vertical direction (which may be referred to as "90° direction"), or even when the adhesive tape is elongated at a relatively high speed, the adhesive tape can be stripped off more easily and more quickly.

The form of the filler particles is not limited and can be selected as appropriate to an extent that does not impair the effect of one or more embodiments of the present invention. Examples include hollow particles, solid particles, core-shell particles, balloons, and beads.

The shape of the filler particles is not limited and can be selected as appropriate according to the purpose. The filler particles may have regular shapes or irregular shapes. Specific examples of the shape of the filler particles include polygonal, cubic, oval, spherical, needle-like, flat plate-like, and scale-like shapes. The filler particles having these shapes may be used singly or in combination of two or more. The fillers having these shapes may be agglomerated. Among those, oval, spherical, and polygonal shapes are preferred as the shape of the filler particles. When the filler particles have shapes such as oval, spherical, and polygonal shapes, the adhesive tape slides well on the adherend when elongated, so that the adhesive tape can be stripped off more easily and more quickly. Spherical shapes are particularly preferred.

The filler particles may be inorganic filler or organic filler. These filler particles may be used singly or in combination of two or more.

Examples of the material of the inorganic filler include metals, metal hydroxides, metal oxides, silicates, carbon, silica, and glass. Examples of the metals that can be used include aluminum, magnesium, zirconium, calcium, barium, tin, nickel, titanium, copper, silver, and gold. Examples of the metal hydroxides that can be used include aluminum hydroxide, magnesium hydroxide, zirconium hydroxide, calcium hydroxide, and barium hydroxide. Examples of the metal oxides that can be used include silicon oxide, magnesium oxide, zinc oxide, titanium oxide, zirconium oxide, iron oxide, aluminum oxide, and calcium oxide. Examples of the silicates that can be used include talc and mica.

Examples of the material of the organic filler include polyolefin resins, polyester resins, polystyrene resins, polyurethane resins, silicone resins, rubber resins, urea-formalin resins, styrene/methacrylate copolymers, fluorine resins, acrylic resins, polycarbonate resins, polyamide resins, epoxy resins, and thermosetting resins. Among those, silicone fillers formed from silicone resins and/or silicone rubbers are preferred.

As the silicone filler, specifically, for example, silicone rubber particles produced by three-dimensionally crosslinking linear organopolysiloxane (see Japanese Unexamined Patent Application Publication No. S63-77942, Japanese Unexamined Patent Application Publication No. H3-93834, Japanese Unexamined Patent Application Publication No. H04-198324) and powdered silicone rubber (see U.S. Pat. No. 3,843,601, Japanese Unexamined Patent Application Publication No. S62-270660, Japanese Unexamined Patent Application Publication No. S59-96122) can be used. Furthermore, silicone composite particles (Japanese Unexamined Patent Application Publication No. H7-196815) can be used, which have a structure (core-shell structure) in which the surfaces of silicone rubber particles obtained by the above method are coated with a silicone resin that is a cured product of polyorganosilsesquioxane having a crosslinked structure like a three-dimensional network represented by $(R'SiO_{3/2})_n$ (where R' represents a substituted or unsubstituted monovalent hydrocarbon group).

In particular, the adhesive layer may contain core-shell silicone composite particles in which the core is silicone rubber particles and the shell covering the core is silicone resin. When the adhesive layer contains core-shell silicone composite particles, both of impact resistance imparted by silicone rubber particles and reworkability imparted by silicone resin can be achieved more effectively. Examples of such silicone particles that can be used include TREFIL E-500, TREFIL E-600, TREFIL E-601, and TREFIL E-850, which are product names available from Dow Corning Toray Silicone Company, Ltd. and KMP-600, KMP-601, KMP-602, and KMP-605 commercially available from Shin-Etsu Chemical Co., Ltd.

As another silicone filler, acrylic modified silicone particles can be used. An example of the acrylic modified silicone particles is an emulsion graft polymer of polyorganosiloxane represented by the following general formula (C), an acrylate monomer and/or a methacrylate monomer, and a monomer containing a functional group copolymerizable therewith. For example, commercially available products such as CHALINE R-170S and CHALINE R-200 (available from Nissin Chemical Industry Co., Ltd.) can be used as the acrylic modified silicone particles.

[Chem. 2]

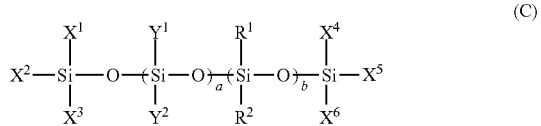

(C)

(In general formula (C), R1 and R2 each independently represent a substituted or unsubstituted alkyl group having 1 to 20 carbon atoms or an aryl group having 6 to 20 carbon atoms, X1, X2, X3, X4, X5, and X6 each independently represent a substituted or unsubstituted alkyl group having 1 to 20 carbon atoms, an aryl group having 6 to 20 carbon atoms, an alkoxy group having 1 to 20 carbon atoms, or a hydroxyl group, Y1 and Y2 each independently represent X1 or a group represented by —[O—Si(X7)(X8)]c-X9, where X7, X8, and X9 each independently represent a substituted or unsubstituted alkyl group having 1 to 20 carbon atoms, an aryl group having 6 to 20 carbon atoms, an alkoxy group having 1 to 20 carbon atoms, or a hydroxyl group, at least two groups in X1, X2, X3, X4, X5, X6, X7, X8, and X9 and Y1 and Y2 are hydroxyl groups, and a, b, and c are each independently a positive number of $0 \leq a \leq 1,000$, a positive number of 100 b 10,000, and a positive number that satisfies $1 \leq c \leq 1,000$.)

It is preferable to use filler particles with an average particle size of 0.01 μm to 70 μm, it is further preferable to use filler particles with an average particle size of 0.05 μm to 50 μm, it is more preferable to use filler particles with an average particle size of 0.1 μm to 30 μm, and it is even more preferable to use filler particles with an average particle size of 0.5 μm to 15 μm. The particle size of the filler particles may be smaller than the thickness of the adhesive. When the average particle size of the filler particles falls within the above range, both higher adhesive performance and high removability can be achieved.

The average particle size of the particles refers to the volume average particle size and can be measured using a laser diffraction instrument (Microtrac).

The adhesive layer may or may not contain the filler particles, but the adhesive layer may contain the filler particles because the filler particles exposed from the surface of the adhesive layer when the adhesive tape is stretched and peeled off facilitates peeling of the adhesive layer from the adherend and enhances the removability. When the adhesive layer contains the filler particles, the amount of the filler particles can be set as appropriate but, in particular, less than 25 parts by mass per 100 parts by mass of the adhesive resin to obtain even higher removability. More specifically, the amount of the filler particles in the adhesive layer may be more than 0 parts by mass and less than 25 parts by mass per 100 parts by mass of the adhesive resin, more than 0 parts by mass and 20 parts by mass or less, 1 part by mass to 18 parts by mass, or 2 parts by mass to 15 parts by mass. When the amount of the filler particles in the adhesive layer falls within the above range, both of higher adhesive performance and high removability by stretching at a desired elongation angle to the adherend surface can be achieved.

<Other Additives>

The adhesive layer and the adhesive forming the same may contain additives such as plasticizers, softeners, antioxidants, flame retardants, colorants such as pigments and dyes, leveling agents, thickening agents, water repellent agents, and antifoaming agents, as other components.

(2) Characteristics and Physical Properties

The tensile stress at 100% strain based on a stress-strain curve of the adhesive layer in one or more embodiments of the present invention may be 3 N/cm$^2$ to 70 N/cm$^2$, 5 N/cm$^2$ to 60 N/cm$^2$, or 8 N/cm$^2$ to 50 N/cm$^2$. This is because when the tensile stress at 100% strain based on a stress-strain curve of the adhesive layer falls within the above range, a strength that prevents tearing of the adhesive layer during removal can be ensured, and flexibility necessary for conformability to steps can be ensured.

The tensile stress at 100% strain based on a stress-strain curve of the adhesive layer is a physical property attributed to the adhesive that constitutes the adhesive layer. In other words, the tensile stress at 100% strain based on a stress-strain curve of the adhesive layer means the tensile stress at 100% strain based on a stress-strain curve of the adhesive forming the adhesive layer. The tensile stress at 100% strain based on a stress-strain curve of the adhesive layer refers to a tensile stress at 100% strain in a stress-strain curve (called S-S curve) measured by pulling a test piece made of the adhesive layer with a thickness of approximately 400 μm, a gauge length of 2 cm, and a width of 1 cm obtained by laminating 50 μm thick adhesive layers, at a pulling speed of 300 mm/min using a tensile tester in a measurement environment of a temperature of 23° C. and a humidity of 50%.

The breaking strength of the adhesive layer is not limited but may be 0.3 MPa to 3.5 MPa, in particular, 0.4 MPa to 2.5 MPa, or 0.5 MPa to 1.5 MPa. When the breaking strength of the adhesive layer falls within the above range, in combination with the foam base described above, the tearing of the adhesive tape can be suppressed when the adhesive tape is stretched and stripped off, and the load for elongating the adhesive tape is not too excessive, thereby facilitating removal work by pulling off. In addition, when the adhesive tape is stretched and stripped off, adhesive residue due to cohesive failure of the adhesive layer is less likely to occur, and sufficient adhesiveness can be obtained.

The breaking strength of the adhesive layer refers to a stress value measured when the adhesive layer punched out in a dumbbell shape with a gauge length of 20 mm and a width of 10 mm is pulled in the length direction at a pulling speed of 300 mm/min using a Tensilon tensile tester (Model: RTF1210 from A&D Company, Limited) at 23° C. and 50% RH and broken.

The elongation at break of the adhesive layer is not limited but may be 500% to 5000%, 700% to 4000%, or 900% to 3800%. When the elongation at break of the adhesive layer falls within the above range, both more suitable adhesiveness and removability (ease of peeling) can be achieved in combination with the foam base described above.

The elongation at break of the adhesive layer refers to a tensile elongation percentage measured when the adhesive layer punched out in a dumbbell shape with a gauge length of 20 mm and a width of 10 mm is pulled in the length direction at a pulling speed of 300 mm/min using a Tensilon tensile tester (Model: RTF1210 from A&D Company, Limited) at 23° C. and 50% RH and broken.

The temperature at which the adhesive layer exhibits the peak value of loss tangent (tan δ) at a frequency of 1 Hz may be −40° C. to 20° C., −30° C. to 15° C., or −20° C. to 10° C. When the peak value of loss tangent of the adhesive layer falls within this range, satisfactory adhesiveness to an adherend at room temperature is easily imparted.

The loss tangent (tan δ) at a frequency of 1 Hz of the adhesive layer is obtained from the storage modulus (G') and the loss modulus (G") obtained by dynamic viscoelasticity measurement with temperature variance by the formula tan δ=G"/G'. In dynamic viscoelasticity measurement, a viscoelasticity tester (from TA Instruments Japan, product name: ARES G2) is used. The adhesive layer formed to a thickness of approximately 2 mm as a test piece is placed between the parallel disks with a diameter of 8 mm serving as a measuring section of the tester, and the storage modulus (G') and the loss modulus (G") are measured from −50° C. to 150° C. at a frequency of 1 Hz.

The thickness of the adhesive layer in one or more embodiments of the present invention may be 5 μm to 100 μm, 15 μm to 80 μm, or 25 μm to 75 μm to achieve both high adhesive strength to an adherend and the foam base and high conformability.

The thickness of the adhesive layer refers to the average of a total of 25 thicknesses measured by cutting the adhesive tape in the width direction at five locations at 100 mm intervals in the length direction, and measuring the thickness of the adhesive layer at five points at 100 mm intervals in the width direction in each of the cut sections using TH-104 Thickness Gauge for paper and films (from TESTER SANGYO CO., LTD.).

3. Adhesive Tape

The adhesive tape of one or more embodiments of the present invention may include other layers as needed in addition to the foam and the adhesive layer. Examples of the other layers include laminate layers such as polyester films, light shielding layers, light reflective layers, and heat conductive layers such as metal layers to impart dimensional stability, satisfactory tensile strength, and removability of the adhesive tape.

The adhesive tape of one or more embodiments of the present invention may have a release sheet laminated on a surface of the adhesive layer. Examples of the release sheet that can be used include films produced from synthetic resins such as polyethylene, polypropylene, and polyester, paper, non-woven fabric, cloth, foam sheets, or metal bases, and laminates thereof with release treatment such as silicone treatment, long-chain alkyl treatment, or fluorine treatment on at least one surface.

The adhesive tape of one or more embodiments of the present invention may have a thickness of 400 μm or less to contribute to thickness reduction of electronic devices. The thickness may be 100 μm to 350 μm, 150 μm to 300 μm, or 200 μm to 350 μm so that the foam is less likely to be torn when the adhesive tape is pulled off when removed, and satisfactory conformability to steps can be achieved. The thickness of the adhesive tape does not include the thickness of the release sheet.

When indentation adhesive strength is measured with a 1 mm wide frame shape, the adhesive tape of one or more embodiments of the present invention may have a strength value of 30 N/cm$^2$ or more, 40 N/cm$^2$ or more, or 50 N/cm$^2$ or more. Increasing the adhesive strength in this method can ensure the adhesive strength required to fix the parts and ensure water resistance.

Figure 2:
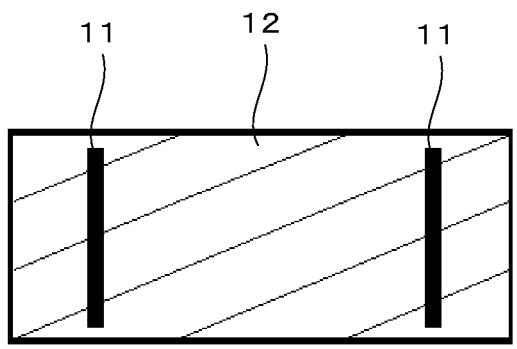
FIG. 2 is a schematic diagram illustrating a test piece used in an impact resistance test as viewed from the top.
Figure 3:
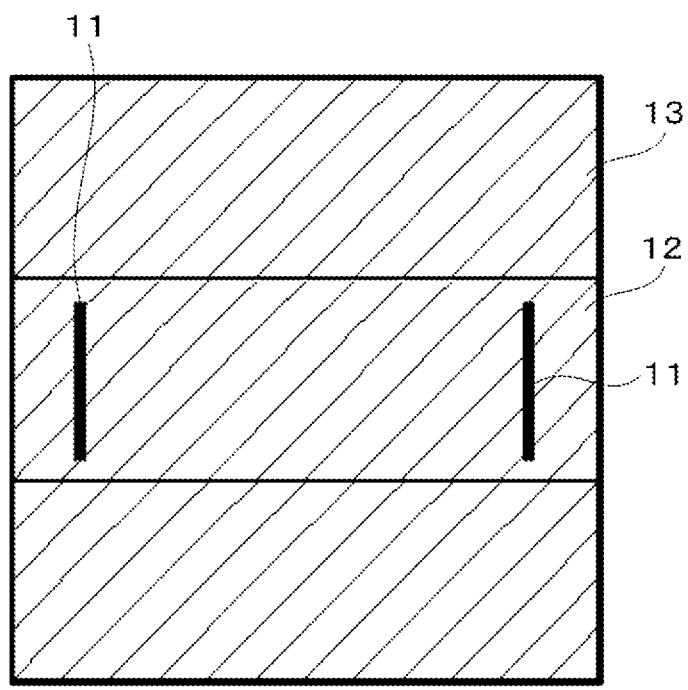
FIG. 3 is a schematic diagram illustrating a state in which the test piece used for the impact resistance test is attached to an acrylic sheet, as viewed from the top.

The indentation adhesive strength can be measured using a 1 mm wide frame shape of the adhesive tape by the following measurement method (1) to (3). The detailed drawings in the following measurement method (1) to (3) can be found in FIGS. 1 to 3 in WO 2018/230323. (1) At 23° C., the adhesive tape punched out into a window shape with outer dimensions of 15 mm square and a width of 1 mm is attached to a 2 mm thick and 20 mm square acrylic sheet (Acrylite MR200 (trade name) from MITSUBISHI RAYON CO., LTD., hue: transparent, same as below). (2) Next, the acrylic sheet with the adhesive tape prepared in (1) is attached to a 2 mm thick, 30×60 mm rectangular SUS sheet with a 10 mm diameter hole at the center such that the center of the acrylic sheet and the center of the SUS plate are aligned, and then the acrylic sheet and the SUS sheet are pressurized with a 2 kg roller with one round trip and left at 23° C. for one hour to make a test piece.

(3) The acrylic sheet is pushed through the hole in the SUS plate from the SUS side of the test piece using a tensile tester with an 8 mm diameter stainless steel probe at 10 mm/min, and the strength at which the acrylic sheet peels off is measured.

The adhesive tape of one or more embodiments of the present invention may have a 180° peel adhesive strength of 5 N/20 mm or more, in a range of 10 N/20 mm to 50 N/20 mm, or in a range of 10 N/20 mm to 45 N/20 mm. When the peel adhesive strength falls within the above range, the adhesive tape can be easily pulled off when stretched and removed at a desired tensile angle to the bonded surface of the adherend, while having moderate adhesive strength without causing peeling or displacement from the adherend.

The 180° peel adhesive strength of the adhesive tape refers to a value measured in accordance with JIS Z 0237.

The adhesive tape of one or more embodiments of the present invention can be produced, for example, by a direct method in which the adhesive is applied directly to the foam and dried, or by a transfer method in which the adhesive is applied to a release sheet and dried to form an adhesive layer and the adhesive layer is then laminated with the foam. When, for example, an acrylic adhesive is used as the adhesive to form the adhesive layer, the adhesive layer laminated on one side or both sides of the foam by the direct method or the transfer method may be aged for 2 to 7 days at 20° C. to 50° C., or at 23° C. to 45° C. to achieve both high adhesive strength to an adherend and the foam base and high conformability.

4. Usage

The adhesive tape of one or more embodiments of the present invention is particularly suitably used, for example, for fixing that is required to adhere to uneven surfaces or large steps and required not to destroy the adherend in removal. For example, the adhesive tape of one or more embodiments of the present invention may be used for bonding members that constitute an electronic device. The adhesive tape of one or more embodiments of the present invention may be used for bonding members that constitute an electronic device and can be peeled off by stretching to release the bond between the members.

II. Articles

The article of one or more embodiments of the present invention is an article using the adhesive tape described in the above section "I. Adhesive Tape". The adhesive tape is attached to a member of an article and is suitably used, in particular, for fixing members having uneven surfaces or large steps and required to be easy to disassemble.

The member having uneven surfaces or large steps is often used as a member of articles such as electronic terminals such as car navigation systems and smartphones, automobiles, building materials, office automation equipment (OA equipment), and home appliances.

Among those, the article of one or more embodiments of the present invention may be an electronic device using the adhesive tape described in the above section "I. Adhesive Tape". Specific examples of the member of an electronic device include two or more housings that constitute an electronic terminal, a protective panel for an information display, an image display module, and a touch panel member. The electronic device may have the members fixed using the adhesive tape of one or more embodiments of the present invention.

The article such as an electronic terminal having two or more housings, a protective panel for an information display, an image display module, and/or a touch panel member fixed by the adhesive tape described in the above section "I. Adhesive Tape" has high adhesive strength, can be removed in disassembly, and has high water resistance.

The present disclosure is not limited to the foregoing embodiments. The foregoing embodiments are illustrative, and any embodiment that has substantially the same configuration as the technical concept described in the claims of the present disclosure and achieves similar effects is included in the technical scope of the present disclosure.

EXAMPLES

Although one or more embodiments of the present invention will be described more specifically with examples and comparative examples, one or more embodiments of the present invention is not intended to be limited by the following examples.

[1] Preparation of Adhesive Resin Solution

Adhesive resin solutions were prepared according to the following method.

Preparation Example 1-1: Adhesive Resin Solution (a-1)

In a reaction vessel equipped with a stirrer, a reflux condenser, a nitrogen inlet tube, a thermometer, and a dropping funnel, 75.94 parts by mass of n-butyl acrylate, 5 parts by mass of 2-ethylhexyl acrylate, 15 parts by mass of cyclohexyl acrylate, 4 parts by mass of acrylic acid, 0.06 parts by mass of 4-hydroxybutyl acrylate, and 200 parts by mass of ethyl acetate were charged, and the temperature was raised to 65° C. with nitrogen blown in with stirring. A mixture (1) was thus obtained. Subsequently, to the mixture (1), 4 parts by mass of a solution of 2,2'-azobisisobutyronitrile (solid content of 2.5% by mass) dissolved, in advance, in ethyl acetate was added, and the mixture was held at 65° C. for 10 hours with stirring to yield a mixture (2). Subsequently, the mixture (2) was diluted with 98 parts by mass of ethyl acetate and filtered through a 200 mesh wire cloth to yield an acrylic copolymer solution (1) with a weight average molecular weight of 1,600,000 (in terms of polystyrene).

Subsequently, to 100 parts by mass of the acrylic copolymer solution (1), 5 parts by mass of polymerized rosin ester-based tackifier resin (D-125, ARAKAWA CHEMICAL INDUSTRIES, LTD.) and 15 parts by mass of petroleum-based tackifier resin (FTR (registered trademark) 6125 from Mitsui Chemicals, Inc.) were mixed and stirred, and then ethyl acetate was added to yield an adhesive resin solution (a-1) with a solid content of 31% by mass.

Preparation Example 1-2: Adhesive Resin Solution (a-2)

In a reaction vessel equipped with a stirrer, a reflux cooler, a thermometer, a dropping funnel, and a nitrogen gas inlet, 96.4 parts by mass of n-butyl acrylate, 3.5 parts by mass of acrylic acid, 0.1 parts by mass of 2-hydroxyethyl acrylate, and 0.1 parts by mass of 2,2'-azobisisobutyronitrile as a polymerization initiator were dissolved in a solvent of 100 parts by mass of ethyl acetate and polymerized at 70° C. for 12 hours to yield an acrylic copolymer with a weight average molecular weight of 800,000 (in terms of polystyrene). Subsequently, to 100 parts by mass of the acrylic copolymer, 10 parts by mass of PENSEL D135 (pentaerythritol ester of polymerized rosin) from ARAKAWA CHEMICAL INDUSTRIES, LTD. and 10 parts by mass of SUPER ESTER A100 (glycerol ester of disproportionated rosin) from ARAKAWA CHEMICAL INDUSTRIES, LTD. were added. With addition of ethyl acetate, the mixture was stirred to be homogeneous to yield an adhesive resin solution (a-2) with a non-volatile content of 35%.

[2] Preparation of Adhesive

Adhesives were prepared according to the following method.

Preparation Example 2-1: Adhesive (A-1)

To 100 parts by mass of the solid content of the adhesive resin solution (a-1), 4 parts by mass of KMP-601 (volume average particle size: 12 μm) from Shin-Etsu Chemical Co., Ltd. was added as silicone particles. Subsequently, 1.0 parts by mass of BURNOCK D-40 (from DIC Corporation, trimethylolpropane adduct of tolylene diisocyanate, isocyanate content of 7% by mass, non-volatile content of 40% by mass) was added as a crosslinking agent per 100 parts by mass of the adhesive resin solution (a-1) and mixed by stirring to be homogenous. Then, ethyl acetate was added to yield an adhesive (A-1) with a solid content of 30% by mass.

Preparation Example 2-2: Adhesive (A-2)

To 100 parts by mass of the solid content of the adhesive resin solution (a-1), 10 parts by mass of KMP-601 from Shin-Etsu Chemical Co., Ltd. was added as silicone particles. Subsequently, 1.0 parts by mass of BURNOCK D-40 was added as a crosslinking agent per 100 parts by mass of the adhesive resin solution (a-1) and mixed by stirring to be homogenous. Then, ethyl acetate was added to yield an adhesive (A-2) with a solid content of 30% by mass.

Preparation Example 2-3: Adhesive (A-3)

To 100 parts by mass of the solid content of the adhesive resin solution (a-1), 10 parts by mass of KMP-600 (volume average particle size: 5 μm) from Shin-Etsu Chemical Co., Ltd. was added as silicone particles. Subsequently, 1.0 parts by mass of BURNOCK D-40 was added as a crosslinking agent per 100 parts by mass of the adhesive resin solution (a-1) and mixed by stirring to be homogenous. Then, ethyl acetate was added to yield an adhesive (A-3) with a solid content of 30% by mass.

Preparation Example 2-4: Adhesive (A-4)

To 100 parts by mass of the solid content of the adhesive resin solution (a-1), 8 parts by mass of KMP-602 (volume average particle size: 30 μm) from Shin-Etsu Chemical Co., Ltd. was added as silicone particles. Subsequently, 1.0 parts by mass of BURNOCK D-40 was added as a crosslinking agent per 100 parts by mass of the adhesive resin solution (a-1) and mixed by stirring to be homogenous. Then, ethyl acetate was added to yield an adhesive (A-4) with a solid content of 30% by mass.

Preparation Example 2-5: Adhesive (A-5)

To 100 parts by mass of the solid content of the adhesive resin solution (a-1), 20 parts by mass of KMP-600 from Shin-Etsu Chemical Co., Ltd. was added as silicone particles. Subsequently, 1.0 parts by mass of BURNOCK D-40 was added as a crosslinking agent per 100 parts by mass of the adhesive resin solution (a-1) and mixed by stirring to be homogenous. Then, ethyl acetate was added to yield an adhesive (A-5) with a solid content of 30% by mass.

Preparation Example 2-6: Adhesive (A-6)

To 100 parts by mass of the solid content of the adhesive resin solution (a-1), 1.0 parts by mass of BURNOCK D-40 was added as a crosslinking agent and mixed by stirring to be homogenous. Then, ethyl acetate was added to yield an adhesive (A-6) with a solid content of 30% by mass.

Preparation Example 2-7: Adhesive (A-7)

To 100 parts by mass of the solid content of the adhesive resin solution (a-2), 6 parts by mass of KMP-601 from Shin-Etsu Chemical Co., Ltd. was added as silicone particles. Subsequently, 1.1 parts by mass of BURNOCK D-40 was added as a crosslinking agent per 100 parts by mass of the adhesive resin solution (a-1) and mixed by stirring to be homogenous. Then, ethyl acetate was added to yield an adhesive (A-7) with a solid content of 30% by mass.

[3] Preparation of Adhesive Tape

Example 1

On a surface of a release liner, the adhesive (A-1) was applied using a bar coater so that the thickness of the adhesive layer after drying was 35 μm, and the adhesive was dried at 80° C. for 3 minutes to produce an adhesive layer.

The adhesive layer was then attached to both sides of a foam base (B-1) [elastomer foam base with an average thickness of 230 μm (density of 0.51 g/cm$^3$, tensile strength of 704 N/cm$^3$ in the flow direction, tensile strength of 535 N/cm$^3$ in the width direction, compressive strength at 25% of 142 kPa, elongation at break of 661%, tensile stress of 75 N/cm$^2$ at 100% strain based on a stress-strain curve)] in which the wetting index was adjusted to 50 mN/m by applying corona treatment to the surfaces. The adhesive layer was cured for 48 hours at 40° C. to produce an adhesive tape.

Example 2

On a surface of a release liner, the adhesive (A-2) was applied using a bar coater so that the thickness of the adhesive layer after drying was 50 μm, and the adhesive was dried at 80° C. for 3 minutes to produce an adhesive layer.

The adhesive layer was then attached to both sides of a foam base (B-2) [polyolefin foam base with an average thickness of 200 μm (density of 0.49 g/cm$^3$, tensile strength of 1475 N/cm$^3$ in the flow direction, tensile strength of 931 N/cm$^3$ in the width direction, compressive strength at 25% of 466 kPa, elongation at break of 516%, tensile stress of 477 N/cm$^2$ at 100% strain based on a stress-strain curve)] in which the wetting index was adjusted to 50 mN/m by applying corona treatment to the surfaces. The adhesive layer was cured for 48 hours at 40° C. to produce an adhesive tape.

Example 3

An adhesive tape was obtained in the same manner as in Example 2, except that the adhesive (A-3) was used instead of the adhesive (A-2).

Example 4

An adhesive tape was obtained in the same manner as in Example 2, except that the adhesive (A-4) was used instead of the adhesive (A-2).

Example 5

An adhesive tape was obtained in the same manner as in Example 2, except that the adhesive (A-5) was used instead of the adhesive (A-2).

Example 6

An adhesive tape was obtained in the same manner as in Example 2, except that the adhesive (A-6) was used instead of the adhesive (A-2).

Example 7

An adhesive tape was obtained in the same manner as in Example 1, except that the adhesive (A-3) was used instead of the adhesive (A-2).

Comparative Example 1

On a surface of a release liner, the adhesive (A-6) was applied using a bar coater so that the thickness of the adhesive layer after drying was 50 μm, and the adhesive was dried at 80° C. for 3 minutes to produce an adhesive layer.

The adhesive layer was then attached to both sides of a foam base (B-3) [elastomer foam base with an average thickness of 200 μm (density of 0.39 g/cm$^3$, tensile strength of 617 N/cm$^3$ in the flow direction, tensile strength of 402 N/cm$^3$ in the width direction, compressive strength at 25% of 96 kPa, elongation at break of 643%, tensile stress of 155 N/cm$^2$ at 100% strain based on a stress-strain curve)] in which the wetting index was adjusted to 50 mN/m by applying corona treatment to the surfaces. The adhesive layer was cured for 48 hours at 40° C. to produce an adhesive tape.

Comparative Example 2

On a surface of a release liner, the adhesive (A-2) was applied using a bar coater so that the thickness of the adhesive layer after drying was 55 μm, and the adhesive was dried at 80° C. for 3 minutes to produce an adhesive layer.

The adhesive layer was then attached to both sides of a base (B-4) [a base with an average thickness of 200 μm prepared from a resin composition (1) (mixture of styrene-isoprene copolymer and styrene-isoprene-styrene copolymer, 25% by mass of styrene-derived structural units represented by formula (1), the proportion of the styrene-isoprene copolymer to the total amount of the resin composition (1) is 17% by mass) by a heat press (pressure 0.5 MPa, press plate temperature 130° C., press time 2 minutes) (density of 0.97 g/cm$^3$, tensile strength of 1568 N/cm$^3$ in the flow direction, tensile strength of 1236 N/cm$^3$ in the width direction, compressive strength at 25% of 1191 kPa, elongation at break of 1083%, tensile stress of 102 N/cm$^2$ at 100% strain based on a stress-strain curve)]. The adhesive layer was cured for 48 hours at 40° C. to produce an adhesive tape.

[Chem. 3]

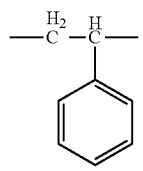

(1)

<Physical Properties of Foam Base>

The density, the tensile strengths in the flow direction and the width direction, the compressive strength at 25%, the elongation at break, and the tensile stress at 100% strain based on a stress-strain curve for the foam bases used in the examples and the comparative examples were measured by the same methods as described above.

The tensile stress at 100% strain based on a stress-strain curve, the tensile strength, and the elongation at break of the adhesive layer were measured by the same methods as described above. To determine the average particle size of filler particles in the adhesive layer, the volume average particle size of the particles was measured using a laser diffraction instrument (Microtrac).

<Thickness of Adhesive Layer>

The thickness of the adhesive layer refers to the average of a total of 25 thicknesses measured by cutting the double-sided adhesive tape in the width direction at five locations at 100 mm intervals in the length direction, and measuring the thickness of the adhesive layer at five points at 100 mm intervals in the width direction in each of the cut sections using TH-104 Thickness Gauge for paper and films (from TESTER SANGYO CO., LTD.).

<Thickness of Foam Base>

The thickness of the foam base is the average of the thicknesses at five locations at 100 mm intervals in the length direction measured using Dial Thickness Gauge type G from OZAKI MFG. CO., LTD.

<Total Thickness of Adhesive Tape>

The total thickness of the adhesive tape obtained in the examples and the comparative examples is the average of the thicknesses at five locations at 100 mm intervals in the length direction measured using Dial Thickness Gauge type G from OZAKI MFG. CO., LTD in a state in which the release liner is stripped off.

<Evaluation Method for Impact Resistance>

Two pieces of adhesive tape 11 cut to a length of 20 mm and a width of 2 mm were attached in parallel with a gap of 40 mm to a polycarbonate plate 12 with a thickness of 2 mm and outer dimensions of 25 mm×50 mm (see FIG. 2), and then attached to an acrylic sheet 13 with a thickness of 2 mm and outer dimensions of 50 mm×50 mm (trade name: Acrylite L from MITSUBISHI RAYON CO., LTD., hue: transparent) at the center (see FIG. 3). They were pressurized at 50 N/cm$^2$ for 10 seconds and left at 23° C. for 24 hours to make a test piece.

Figure 4:
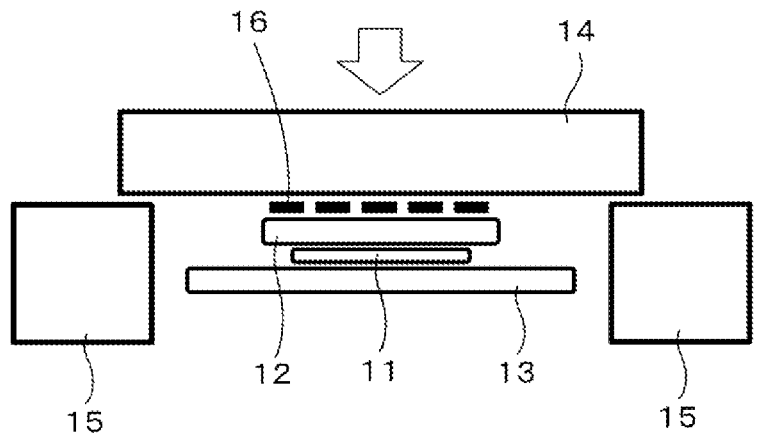
FIG. 4 is a schematic diagram illustrating a testing method for the impact resistance test.

Subsequently, metal pedestals 15 were placed on the table of a DuPont impact tester (from TESTER SANGYO CO., LTD.). A weight 14 of 300 g was attached to the test piece on the polycarbonate plate 12 with tape 16 (see FIG. 4). From a height of 30 cm, an impact punch was dropped five times at 10 second intervals on the test piece with the acrylic sheet 13 facedown. After the dropping, the test piece was visually checked, and if peeling of the adhesive tape 11 of the test piece or breakage of the test piece was not found, the impact punch was dropped from a position 10 cm higher (40 cm) five times at 10 second intervals. Such a test was repeated, and the fall height of the impact punch was measured when peeling of the adhesive tape of the test piece or breakage of the test piece was found. The evaluation was made based on the following criteria.

(Evaluation Criteria)
  A: The fall height of the impact punch was 80 cm or more.
  B: The fall height of the impact punch was 50 cm to less than 80 cm.
  D: The fall height of the impact punch was less than 50 cm.

<Evaluation Method for Step Conformability>

Figure 5:
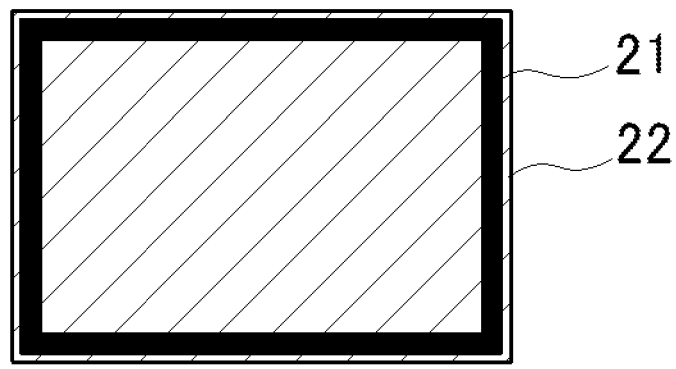
FIG. 5 is a schematic plan view of an acrylic sheet with adhesive tape used to prepare a test piece for a step conformability evaluation test.
Figure 6:
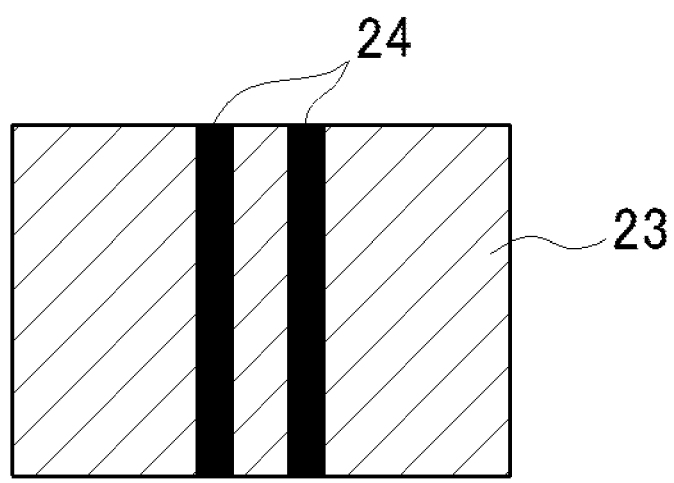
FIG. 6 is a schematic plan view of an acrylic sheet with steps used to prepare a test piece for the step conformability evaluation test.
Figure 7:
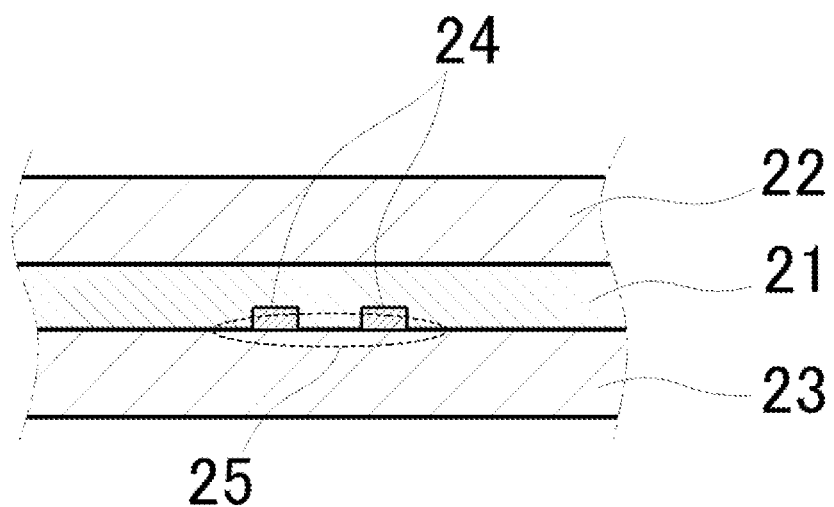
FIG. 7 is a schematic cross-sectional view of a test piece for the step conformability evaluation test.

A frame-shaped sample with outer dimensions of 64 mm×43 mm and a width of 1 mm was prepared using the adhesive tape obtained as described above and attached to an acrylic sheet with a thickness of 2 mm and outer dimensions of 65 mm×45 mm to obtain an acrylic sheet with the adhesive tape (see FIG. 5). Next, two pieces of single-sided adhesive tape (for forming steps) with a polyethylene terephthalate (PET) base with a thickness of 20 μm, a width of 5 mm, and a length of 45 mm were attached in parallel with a gap of 1 cm in the vertical direction to the center of another acrylic sheet with a thickness of 2 mm and outer dimensions of 65 mm×45 mm to make an acrylic sheet with steps (see FIG. 6). After the acrylic sheet with the adhesive tape was placed on the adhesive tape portion of the acrylic sheet with steps at 23° C., the acrylic sheets were pressurized with a 2 kg roller from the edge with one round trip to make a test piece (see FIG. 7), and the resulting test piece fixed with binder clips was left in water 1 m deep for 30 minutes (in compliance with JISC0920 IPX7). After being left, the test piece was visually observed and evaluated according to the following evaluation criteria.

(Evaluation Criteria)
  B: No water intrusion to the interior (the center of the test piece) surrounded by the frame-shaped test tape of the test piece.
  D: Water intrusion to the interior (the center of the test piece) surrounded by the frame-shaped test tape of the test piece.

<Reworkability (Removability)>

The adhesive tape with a width of 5 mm and a length of 60 mm was attached to a clean, surface-smooth aluminum plate, with a 5 mm wide×10 mm long gripping portion protruding from the aluminum plate, and the opposite surface of the adhesive tape was attached to a clean, surface-smooth glass plate and pressurized for 20 minutes at 50° C. and 5 atmospheric pressure to make a test piece. The adhesive tape was left at 23° C. and 50% RH for 1 day after being attached, and then the gripping portion of the adhesive tape was stretched by hand at a speed of approximately 300 mm/min from the horizontal direction of the adhesive tape to the glass side at a tensile angle of 45° at 23° C. and 50% RH. The breakage of the adhesive tape and the degree of the adhesive residue on the adherend after peeling of the adhesive tape in three test cycles were visually evaluated according to the following criteria. The length direction of the test piece corresponded to the flow direction and the stretching direction of the foam base.

(Evaluation Criteria)

A: Tape was stripped off cleanly in all three cycles.

B: Tape was stripped off cleanly in two cycles but broken in one cycle. In the one cycle with breakage, the area of the adhesive tape left without elongating was ⅕ or less of the initial attached area.

C: Tape was stripped off cleanly in two cycles but broken in one cycle. In the one cycle with breakage, the area of the adhesive tape left without elongating was more than ⅕ of the initial attached area.

D: Adhesive tape failed to be stripped off. Or tape was broken in two or more cycles.

The physical properties of the foam bases used, the details of the adhesive tapes in the examples and the comparative examples, and the evaluation results are listed in the following tables.

TABLE 1

| | Foam type | | B-1 | B-2 | B-3 | B-4 |
|---|---|---|---|---|---|---|
| Foam base | Thickness | [μm] | 230 | 200 | 200 | 140 |
| | Tensile stress at 100% strain based on stress-strain curve | [N/cm²] | 75 | 477 | 155 | 102 |
| | Elongation at break | [%] | 661 | 516 | 643 | 1083 |
| | Density | [g/cm³] | 0.51 | 0.49 | 0.39 | 0.97 |
| | Tensile strength in flow direction | [N/cm²] | 704 | 1475 | 617 | 1568 |
| | Tensile strength in width direction | [N/cm²] | 535 | 931 | 402 | 1236 |
| | Elongation at break in flow direction | [%] | 661.0 | 515.5 | 642.5 | 1082.5 |
| | Elongation at break in width direction | [%] | 711.5 | 353.0 | 489.3 | 1054.8 |
| | Compressive strength at 25% | [kPa] | 142 | 466 | 96 | 1191 |

TABLE 2

| | | | Example 1 | Example 2 | Example 3 | Example 4 | Example 5 | Example 6 | Example 7 |
|---|---|---|---|---|---|---|---|---|---|
| Adhesive layer | Adhesive resin type | | A-1 | A-2 | A-3 | A-4 | A-5 | A-6 | A-7 |
| | Thickness | [μm] | 35 | 50 | 50 | 50 | 50 | 50 | 50 |
| | Tensile stress at 100% strain based on stress-strain curve | [N/cm²] | 12.5 | 16 | 18 | 17 | 26.5 | 10.2 | 8.5 |
| | Tensile strength | [N/cm²] | 128 | 122 | 204 | — | 124 | 76 | — |
| | Elongation at break | [%] | 1539 | 1697 | 2023 | — | 2697 | 1093 | — |
| Foam base | Foam type | | B-1 | B-2 | B-2 | B-2 | B-2 | B-2 | B-1 |
| | Thickness | [μm] | 230 | 200 | 200 | 200 | 200 | 200 | 230 |
| Tape Impact resistance | Total thickness | [μm] | 300 | 300 | 300 | 300 | 300 | 300 | 300 |
| | Evaluation | | A | A | A | A | A | B | B |
| | Height | [cm] | 80 | 100 | 95 | 85 | 90 | 70 | 75 |
| | Step conformability (water resistance) | | B | B | B | B | B | B | B |
| | Reworkability | | A | B | B | B | C | C | A |

TABLE 3

| | | | Comparative Example 1 | Comparative Example 2 |
|---|---|---|---|---|
| Adhesive layer | Adhesive resin type | | A-6 | A-2 |
| | Thickness | [μm] | 50 | 55 |
| | Tensile stress at 100% strain based on stress-strain curve | [N/cm²] | 10.2 | 16 |
| | Tensile strength | [N/cm²] | 76 | — |
| | Elongation at break | [%] | 1093 | — |
| Foam base | Foam type | | B-3 | B-4 |
| | Thickness | [μm] | 200 | 140 |
| Tape | Total thickness | [μm] | 300 | 250 |
| Impact resistance | Evaluation | | B | D |
| | Height | [cm] | 70 | 50 |
| | Step conformability (water resistance) | | B | D |
| | Reworkability | | D | A |

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

What is claimed is:

1. An adhesive tape comprising an adhesive layer on one side or both sides of a foam base directly or with another layer interposed therebetween, wherein:

the foam base has a tensile strength of 650 N/cm² or more in a stretching direction of the adhesive tape, the foam base has a compressive strength at 25% of 1000 kPa or less, the foam base has a density of 0.35 g/cm³ to 0.90 g/cm³, and the foam base has a tensile stress of 450 N/cm² or less at 100% strain based on a stress-strain curve in the stretching direction of the adhesive tape.

2. The adhesive tape according to claim 1, wherein the foam base has a tensile strength of 450 N/cm² or more in a direction orthogonal to the stretching direction of the adhesive tape.

3. An adhesive tape comprising an adhesive layer on one side or both sides of a foam base directly or with another layer interposed therebetween, wherein:

the foam base has a tensile strength of 650 N/cm² or more in a flow direction, the foam base has a compressive strength at 25% of 1000 kPa or less, the foam base has a density of 0.35 g/cm³ to 0.90 g/cm³, and the foam base has a tensile stress of 450 N/cm² or less at 100% strain based on a stress-strain curve in the flow direction.

4. The adhesive tape according to claim 3, wherein the foam base has a tensile strength of 450 N/cm² or more in a width direction.

5. The adhesive tape according to claim 3, wherein the foam base has a thickness in a range of 50 μm to 500 μm.

6. The adhesive tape according to claim 3, wherein the foam base contains an elastomer resin as a main component.

7. The adhesive tape according to claim 3, wherein the adhesive layer has a tensile stress of 25 N/cm² or less at 100% strain based on a stress-strain curve.

8. The adhesive tape according to claim 3, wherein the adhesive layer contains filler particles.

9. The adhesive tape according to claim 8, wherein an amount of the filler particles contained in the adhesive layer is less than 20 parts by mass per 100 parts by weight of an adhesive resin.

10. The adhesive tape according to claim 8, wherein the filler particles contained in the adhesive layer comprise silicone fillers.

11. An electronic device comprising the adhesive tape according to claim 3.

12. The electronic device according to claim 11, wherein members that constitute the electronic device are bonded with the adhesive tape.

* * * * *